US011645993B2

(12) United States Patent
Zhang et al.

(10) Patent No.: US 11,645,993 B2
(45) Date of Patent: May 9, 2023

(54) DISPLAY SUBSTRATE INCLUDING DECODER AND GATE CIRCUIT, DRIVING METHOD, AND DISPLAY PANEL

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Yehao Zhang, Beijing (CN); Meng Shi, Beijing (CN); Jing Zhao, Beijing (CN); Yadong Huang, Beijing (CN); Dapeng Liang, Beijing (CN); Zhenguo Xu, Beijing (CN); Xiuyun Chen, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/622,181

(22) PCT Filed: Dec. 1, 2020

(86) PCT No.: PCT/CN2020/133156

§ 371 (c)(1),
(2) Date: Dec. 22, 2021

(87) PCT Pub. No.: WO2022/116007

PCT Pub. Date: Jun. 9, 2022

(65) Prior Publication Data

US 2022/0415278 A1 Dec. 29, 2022

(51) Int. Cl.

*G06F 3/038* (2013.01)
*G09G 3/36* (2006.01)

(52) U.S. Cl.

CPC ......... *G09G 3/3688* (2013.01); *G09G 3/3677* (2013.01); *G09G 2300/0857* (2013.01); *G09G 2370/045* (2013.01)

(58) Field of Classification Search

CPC ............... G09G 3/3688; G09G 3/3677; G09G 2300/0857; G09G 2370/045

(Continued)

(56) References Cited

U.S. PATENT DOCUMENTS

2004/0008194 A1 1/2004 Shigeta et al.
2006/0262065 A1* 11/2006 Luo ...................... G09G 3/2096 345/98

(Continued)

FOREIGN PATENT DOCUMENTS

CN 1475980 2/2004
CN 101404151 A 4/2009

(Continued)

*Primary Examiner* — Jonathan M Blancha
(74) *Attorney, Agent, or Firm* — IP & T Group LLP

(57) ABSTRACT

A display substrate has a display area and a peripheral area around the display area. The display substrate includes a plurality of sub-pixels arranged in an array in the display area, and an interface circuit, at least two serial-to-parallel converters and at least one display driver that are in the peripheral area. The interface circuit is configured to receive target data including a plurality of serial display data. A serial-to-parallel converter in the at least two serial-to-parallel converters is used to convert the plurality of serial display data into parallel display data. The serial-to-parallel converter is electrically connected to one display driver to provide the parallel display data to the display driver. The display driver is used to output display driving signals to a plurality of sub-pixels according to the parallel display data.

12 Claims, 10 Drawing Sheets

(58) Field of Classification Search
USPC .......................................................... 345/204
See application file for complete search history.

(56) References Cited

U.S. PATENT DOCUMENTS

| | | | | |
|---|---|---|---|---|
| 2008/0218389 | A1* | 9/2008 | Yamagata | H03M 9/00 341/100 |
| 2009/0309869 | A1* | 12/2009 | Umeda | G09G 3/3688 345/87 |
| 2010/0128019 | A1* | 5/2010 | Harada | G09G 3/3611 345/212 |
| 2014/0118371 | A1* | 5/2014 | Kondo | G09G 3/3688 345/530 |
| 2017/0092195 | A1* | 3/2017 | Jung | G09G 3/3266 |

FOREIGN PATENT DOCUMENTS

| | | | |
|---|---|---|---|
| CN | 107863088 | | 3/2018 |
| JP | H8-029754 | A | 2/1996 |
| JP | 2011197352 | A | 10/2011 |

* cited by examiner

DISPLAY SUBSTRATE INCLUDING DECODER AND GATE CIRCUIT, DRIVING METHOD, AND DISPLAY PANEL

CROSS-REFERENCE TO RELATED APPLICATION

This application is a national phase entry under 35 USC 371 of International Patent Application No. PCT/CN2020/133156 filed on Dec. 1, 2020, which is incorporated herein by reference in its entirety.

TECHNICAL FIELD

The present disclosure relates to the field of display technologies, and in particular, to a display substrate, a driving method and a display panel.

BACKGROUND

With the rapid development of display technologies, display panels are widely used in various electronic devices. At present, mainstream solutions in the market mostly convert a video signal into a corresponding driving signal by bonding a plurality of driving chips (i.e., integrated circuits, ICs) on the display panel, so as to drive a display screen to display a screen.

However, a bonding process of the ICs is costly, and a bonding yield is limited. As a result, a production cost of the display panel is high, and a production yield is not high. Therefore, in order to reduce the production cost of the display panel and improve the production yield of the display panel, it is urgent to propose a new display driving solution.

SUMMARY

In an aspect, a display substrate is provided. The display substrate has a display area and a peripheral area around the display area. The display substrate includes a plurality of sub-pixels arranged in an array in the display area, an interface circuit in the peripheral area, at least two serial-to-parallel converters in the peripheral area and at least one display driver in the peripheral area. The interface circuit is configured to receive target data. The target data include a plurality of serial display data. A serial-to-parallel converter in the at least two serial-to-parallel converters is electrically connected to the interface circuit and configured to convert the plurality of serial display data into parallel display data. The serial-to-parallel converter is electrically connected to at least one display driver to provide the parallel display data to the display driver. The display driver is configured to output display driving signals to sub-pixels according to the parallel display data.

In some embodiments, the display substrate further includes a plurality of data lines extending in a first direction and a plurality of gate signal lines extending in a second direction, and the first direction and the second direction intersect. A data line in the plurality of data lines is used to output a display driving signal to at least one sub-pixel, and a gate signal line in the plurality gate signal lines is used to output a row gate signal to at least one sub-pixel.

In some embodiments, a number of the at least one display driver is N, and N is an integer greater than or equal to 2. Each display driver is connected to at least one data line, and the display driver outputs a display driving signal in the display driving signals to sub-pixels through the at least one data line. The serial-to-parallel converters are connected to the display drivers in one-to-one correspondence.

In some embodiments, the display substrate further includes a gate circuit in the peripheral area, and the gate circuit is connected to at least one of the gate signal lines, and outputs the row gate signal to the at least one gate signal line.

In some embodiments, the interface circuit includes at least two data output terminals connected to the serial-to-parallel converters in one-to-one correspondence. The interface circuit is further configured to output the target data to the serial-to-parallel converters through the data output terminals according to a clock signal and a chip selection signal that are received.

In some embodiments, the target data further include address information, and the address information includes S address data, and S is an integer greater than or equal to 2. The interface circuit is further configured to obtain the address information in the target data. The interface circuit is further configured to output at least some of the S address data to at least one serial-to-parallel converter through at least one data output terminal according to the clock signal and the chip selection signal that are received.

In some embodiments, the interface circuit is configured to output the S address data to one serial-to-parallel converter through one data output terminal. Or, the interface circuit is configured to output the S address data to a plurality of the serial-to-parallel converters through a plurality of data output terminals, address data output from different data output terminals are different, and a total number of the address data output from all the plurality of data output terminals is S.

In some embodiments, the display substrate further includes a decoder in the peripheral area. The decoder is electrically connected to at least one serial-to-parallel converter and configured to receive the S address data output from the at least one serial-to-parallel converter and generate a row gate signal. The decoder is further electrically connected to a gate circuit and further configured to output the row gate signal to the gate circuit.

In some embodiments, the target data further include a mode information, and the mode information includes J mode data, and J is an integer greater than or equal to 2. The interface circuit is further configured to obtain the mode information in the target data. The interface circuit is further configured to output at least some of the J mode data to at least one serial-to-parallel converter through at least one data output terminal according to the clock signal and the chip selection signal that are received.

In some embodiments, the serial-to-parallel converter includes a plurality of cascaded D flip-flops. An output terminal of a previous stage D flip-flop is electrically connected to an input terminal of an adjacent next stage D flip-flop. An input terminal of a first stage D flip-flop is electrically connected to a corresponding data output terminal. An output terminal of each D flip-flop in a same serial-to-parallel converter is electrically connected to a same display driver. In some embodiments, the interface circuit is used to output the J mode data to one serial-to-parallel converter through one data output terminal; or the interface circuit is used to output the J mode data to a plurality of serial-to-parallel converters through a plurality of data output terminals, mode data output from different data output terminals are different, and a total number of the mode data output from all the plurality of data output terminals is J. In some embodiments, the display substrate further includes a mode controller located in the peripheral area, and the mode controller is electrically connected to at least one serial-to-parallel converter, and used to receive the J mode data output from the at least one serial-to-parallel converter and electrically connect a first control signal terminal and a second control signal terminal in the display substrate according to the J mode data.

In another aspect, a display panel is provided. The display panel includes the display substrate in any one of the above embodiments.

In yet another aspect, a driving method is provided, including: receiving, by the interface circuit, the target data, obtaining, by the interface circuit, the plurality of serial display data from the target data, and outputting, by the interface circuit, the plurality of serial display data to the at least two serial-to-parallel converters; converting, by the at least two serial-to-parallel converters, the obtained respective serial display data into the parallel display data, and outputting, by the at least two serial-to-parallel converters, the parallel display data to the at least one display driver; and outputting, by the display driver, the display driving signals to sub-pixels according to the obtained parallel display data.

In some embodiments, the display substrate further includes a plurality of data lines. Outputting, by the display driver, the display driving signals to sub-pixels according to the obtained parallel display data, includes: outputting, by each display driver, a display driving signal in the display driving signals to at least one sub-pixel through at least one data line according to the obtained parallel display data.

In some embodiments, outputting, by the interface circuit, the plurality of serial display data to the serial-to-parallel converters, includes: outputting, by the interface circuit, the plurality of serial display data to the serial-to-parallel converters according to a clock signal and a chip selection signal that are received.

In some embodiments, the target data further include address information, and the address information includes S address data, and S is an integer greater than or equal to 2. The method further includes: obtaining, by the interface circuit, the address information in the target data; and outputting, by the interface circuit, the S address data to one serial-to-parallel converter according to the clock signal and chip selection signal that are received; or, outputting, by the interface circuit, the S address data to a plurality of serial-to-parallel converters, address data received by different serial-to-parallel converters being different, and a total number of the address data received by all the plurality of serial-to-parallel converters being S.

In some embodiments, the target data further include a mode information, and the mode information includes J mode data, and J is an integer greater than or equal to 2. The method further includes: obtaining, by the interface circuit, the mode information in the target data; and outputting, by the interface circuit, at least some of the J mode data to at least one serial-to-parallel converter according to the clock signal and chip selection signal that are received.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, but are not limitations on an actual size of a product, an actual process of a method and an actual timing of a signal involved in the embodiments of the present disclosure.

DETAILED DESCRIPTION

Figure 1:
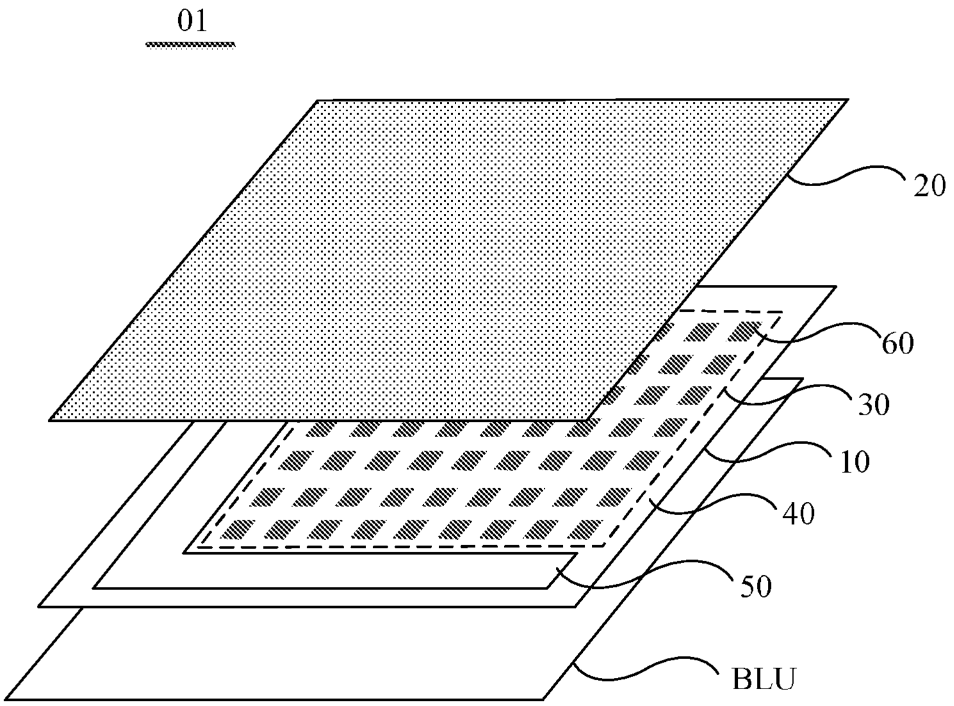
FIG. 1 is a structural diagram of a display panel, in accordance with some embodiments of the present disclosure.

Technical solutions in some embodiments of the present disclosure will be described clearly and completely with reference to the accompanying drawings below. Obviously, the described embodiments are merely some but not all embodiments of the present disclosure. All other embodiments obtained by a person of ordinary skilled in the art on a basis of the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to". In the description of the specification, terms such as "one embodiment", "some embodiments", "exemplary embodiments", "an example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

Below, terms such as "first" and "second" are only used for descriptive purposes, and are not to be construed as indicating or implying relative importance or implicitly indicating the number of indicated technical features. Thus, a feature defined with "first" or "second" may explicitly or implicitly include one or more of the features. In the description of the embodiments of the present disclosure, "a plurality of/the plurality of" means two or more unless otherwise specified.

In the description of some embodiments, "connected" and extensions thereof may be used. For example, the term "electrically connected" may be used in the description of some embodiments, and may be a direct electrical connection, such as an electrical connection in which two or more components are in direct physical contact with each other, or may be an indirect electrical connection through an intermediary.

The phrase "at least one of A, B and C" has a same meaning as the phrase "at least one of A, B or C", both including the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

As used herein, the term "if" is optionally construed as "when" or "in a case where" or "in response to determining" or "in response to detecting", depending on the context.

The use of the phrase "applicable to" or "configured to" herein means an open and inclusive expression, which does not exclude devices that are applicable to or configured to perform additional tasks or steps.

The term such as "about", "substantially" or "approximately" as used herein includes a stated value and an average value within an acceptable range of deviation of a particular value determined by a person of ordinary skilled in the art, considering measurement in question and errors associated with measurement of a particular quantity (i.e., limitations of a measurement system).

Exemplary embodiments are described herein with reference to sectional views and/or plan views as idealized exemplary drawings. In the accompanying drawings, thicknesses of layers and regions are enlarged for clarity. Thus, variations in shape relative to the accompanying drawings due to, for example, manufacturing techniques and/or tolerances may be envisaged. Therefore, the exemplary embodiments should not be construed to be limited to the shapes of regions shown herein, but to include deviations in shape due to, for example, manufacturing. For example, an etched region shown in a rectangular shape generally has a curved feature. Therefore, the regions shown in the accompanying drawings are schematic in nature, and their shapes are not intended to show actual shapes of the regions in a device, and are not intended to limit the scope of the exemplary embodiments.

In embodiments of the present disclosure, as shown in FIG. 1, a display substrate 10 and a display panel 01 including the display substrate 10 are provided. It will be noted that the display substrate 10 may be applied to a liquid crystal display (LCD) panel, or other display panels such as an organic electroluminescent display panel and an e-ink display screen, which is not limited. For the convenience of description, the following embodiments will be explained in an example where the display panel 01 is the LCD panel. The display panel 01 may include the display substrate 10, a liquid crystal layer 20 and a backlight module BLU disposed on a side of the display substrate 10 away from the liquid crystal layer 20, which are stacked. The display substrate 10 has a display area (i.e., active area, AA) 30 and a peripheral area around the AA 30. In addition, the display substrate 10 includes a base 40, a plurality of pixel driving circuits 60 arranged in an array and disposed on a surface of the base 40 proximate to the liquid crystal layer 20 in the AA 30, and a display driving circuit 50 in the peripheral area. In addition, the display substrate further includes a plurality of data lines extending in a first direction and a plurality of gate signal lines extending in a second direction, and the first direction and the second direction intersect.

Each pixel driving circuit 60 may be included in a sub-pixel of the display panel 01. The display driving circuit 50 may be electrically connected to the plurality of pixel driving circuits 60, so as to provide a display-related data signal to the pixel driving circuit 60, so that the pixel driving circuit 60 is able to control, according to the display-related data signal, deflection angles of liquid crystal molecules in the sub-pixel where the pixel driving circuit 60 is located, thereby controlling a brightness of light emitted from the BLU after passing through the liquid crystal layer, and finally realizing image display of the display panel 01.

For example, the base 40 may be a plastic substrate, a ceramic substrate, a glass substrate, or a quartz substrate, or may include the foregoing substrate and at least one film layer disposed on the foregoing substrate, which is not limited in the embodiments of the present disclosure.

It will be noted that the display panel 01 may be applied to an environment that requires a display screen with a large size and strong screen fluency, such as a liquid crystal display screen for displaying fluent dynamic screens on the periphery of a shopping mall or a liquid crystal display screen for displaying at a door of a bank, or may be applied to an occasion that requires a display screen with a small size but strong screen fluency, such as a smart watch or a vehicle-mounted display. The application environment of the display panel 01 is not limited.

Figure 2:
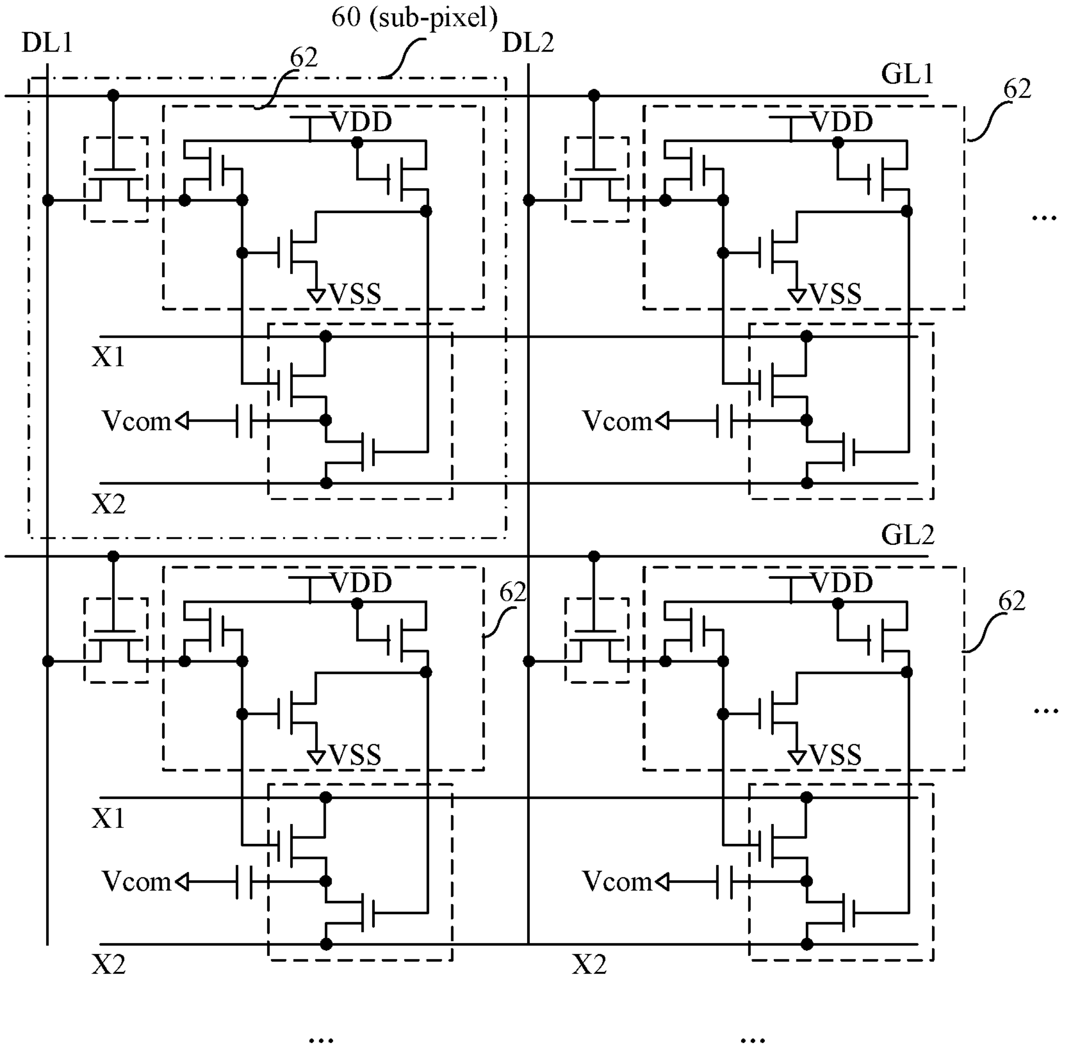
FIG. 2 is a structural diagram of pixel driving circuits, in accordance with some embodiments of the present disclosure.

In some embodiments of the present disclosure, a memory in pixel (MIP) display technology may be used for the plurality of pixel driving circuits 60 arranged in an array in the AA 30. The MIP display technology is to provide a static random access memory (SRAM) 62 as shown in FIG. 2 in each pixel driving circuit 60 of the display panel 01. The pixel driving circuit 60 may use the SRAM 62 to store an input display driving signal for a certain time for display.

Figure 3:
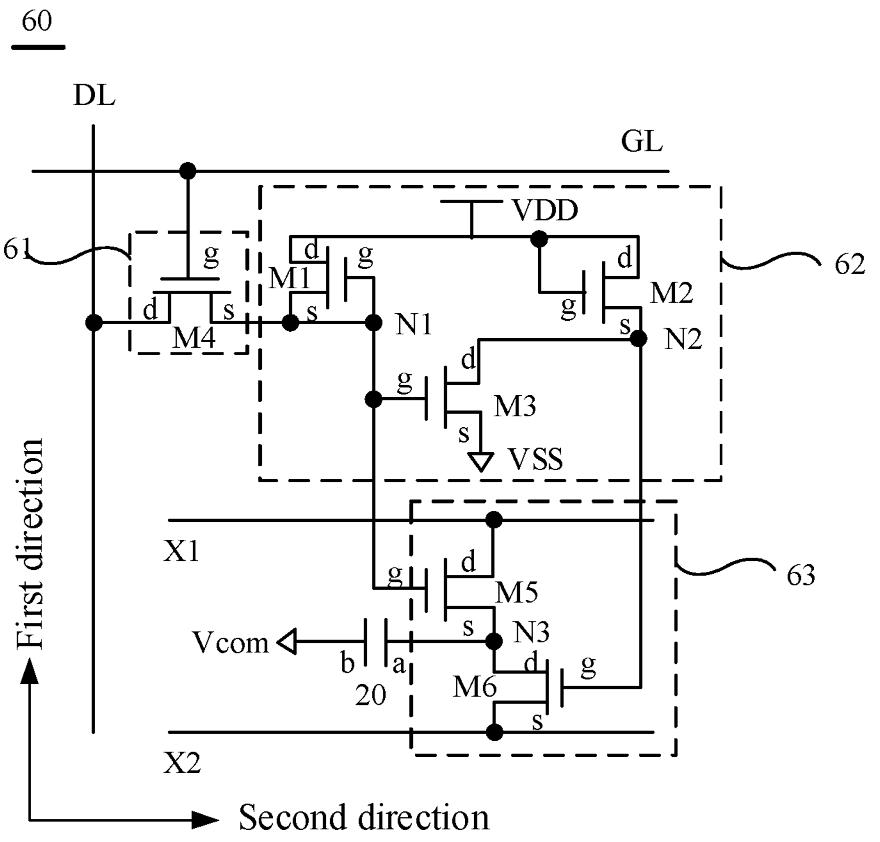
FIG. 3 is a structural diagram of a pixel driving circuit in FIG. 2.

For the convenience of description, considering the pixel driving circuit 60 in FIG. 2 as an example, as shown in FIG. 3, the operating principle of the pixel driving circuit 60 will be described with reference to the voltage waveform diagram shown in FIG. 4 below. The pixel driving circuit 60, as shown in FIG. 3, may include a data writing circuit 61, the SRAM 62 and a driving circuit module 63.

For example, the data writing circuit 61 may include a fourth transistor M4. The SRAM 62 may include a first transistor M1, a second transistor M2 and a third transistor M3. The driving circuit module 63 may include a fifth transistor M5 and a sixth transistor M6.

A gate g of the fourth transistor M4 in the data writing circuit 61 is electrically connected to a gate signal line (i.e., gate line, GL), a first electrode, e.g., a drain d, of the fourth transistor M4 is electrically connected to a data line DL, and a second electrode, e.g., a source s, of the fourth transistor M4 is electrically connected to a second electrode s of the first transistor M1. The data writing circuit 61 is used to transmit a display driving signal transmitted through the data line DL to the second electrode s of the first transistor M1 under an action of a row gate signal transmitted through the gate signal line GL. For example, the row gate signal may be a gate voltage Vgate, and the display driving signal may be a display driving voltage Vdata.

In the SRAM 62, a gate g of the first transistor M1 is electrically connected to a gate g of the third transistor M3, the second electrode s of the first transistor M1 is electrically connected to the second electrode s of the fourth transistor M4, and a first electrode d of the first transistor M1 is electrically connected to a gate g of the second transistor M2. The gate g of the second transistor M2 is electronically connected to a VDD, a first electrode d of the second transistor M2 is electronically connected to the first electrode d of the first transistor M1, and a second electrode s of the second transistor M2 is electronically connected to a first electrode d of the third transistor M3. A gate g of the third transistor M3 and the gate g of the first transistor M1 are electrically connected at a node N1, the first electrode d of the third transistor M3 is electrically connected to the second electrode s of the second transistor M2, and a second electrode s of the third transistor M3 is electrically connected to a ground voltage VSS.

In addition, a gate g of the fifth transistor M5 in the driving circuit module 63 is electrically connected to the gate g of the third transistor M3, a first electrode d of the fifth transistor M5 is electrically connected to a first control signal terminal X1, and a second electrode s of the fifth transistor M5 is electrically connected to an end a of the liquid crystal layer 20. A gate g of the sixth transistor M6 is electrically connected to the second electrode s of the second transistor M2, a first electrode d of the sixth transistor M6 is electrically connected to the end a of the liquid crystal layer 20, and a second electrode s of the sixth transistor M6 is electrically connected to a second control signal terminal X2. Another end b of the liquid crystal layer 20 is electrically connected to a common voltage Vcom.

It will be noted that types of the transistors in the pixel driving circuit 60 are not limited, and the transistors may be N-type transistors or P-type transistors. Below, for the convenience of description, as an example, the above transistors are all N-type transistors for description. In addition, the above description is made in an example where a first electrode of a transistor is a drain d and a second electrode of the transistor is a source s. Alternatively, in some other embodiments of the present disclosure, the first electrode of the transistor may be a source s, and the second electrode of the transistor may be a drain d.

The operating process of the pixel driving circuit 60 is as follows. For example, as shown in FIG. 4, at a P1 phase, when the gate voltage Vgate transmitted through the gate signal line GL is at a high level, the fourth transistor M4 is turned on, and the display driving voltage Vdata (at a high level in this case) transmitted through the data line DL is written into the SRAM 62. In this case, the node N1 is at a high level, so that the third transistor M3 and the fifth transistor M5 are turned on. A node N2 is at a low level due to the ground voltage VSS, and in this case, the sixth transistor M6 is turned off.

Thus, a node N3 is connected to the first control signal terminal X1. It can be seen from FIG. 4 that a voltage supplied from the first control signal terminal X1 has a same phase as the common voltage Vcom, so that a voltage difference between the two ends of the liquid crystal layer 20 is 0, and thus the liquid crystal molecules in the sub-pixel controlled by the pixel driving circuit 60 are not deflected.

Figure 4:
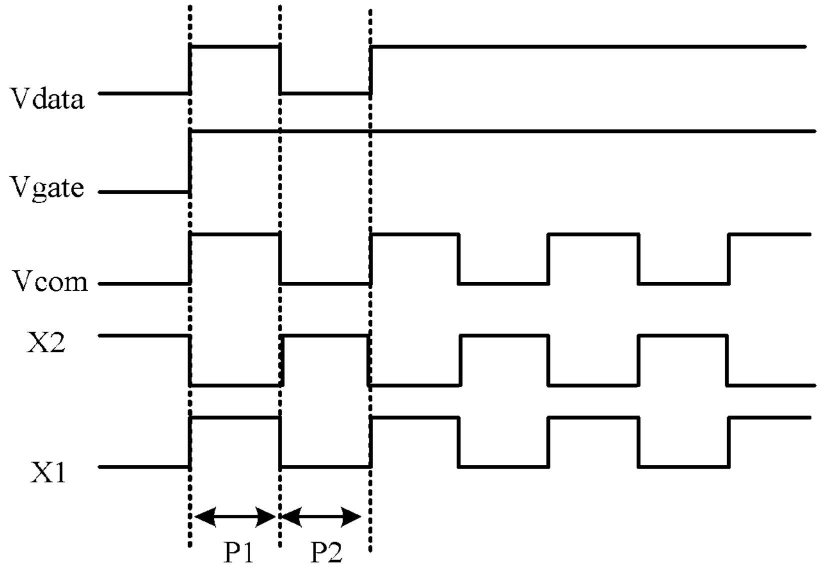
FIG. 4 is a voltage waveform diagram corresponding to the pixel driving circuit in FIG. 3.

Alternatively, as shown in FIG. 4, at a P2 phase, the gate voltage Vgate transmitted through the gate signal line GL is still at a high level, and in this case, the fourth transistor M4 is turned on. However, the display driving voltage Vdata transmitted through the data line DL is at a low level, so that the node N1 is at a low level. In this case, the first transistor M1, the third transistor M3 and the fifth transistor M5 are turned off. The second transistor M2 is turned on, so that the node N2 is at a high level, and in this case, the sixth transistor M6 is turned on, so that the node N3 is connected to the second control signal terminal X2. It can be seen from FIG. 4 that a voltage supplied from the second control signal terminal X2 has a different phase from the common voltage Vcom, so that the voltage difference between the two ends of the liquid crystal layer 20 is not 0, and thus the liquid crystal molecules in the sub-pixel controlled by the pixel driving circuit 60 are deflected.

In this way, gate voltages Vgate (e.g., corresponding Vgate in FIG. 4) and display driving voltages Vdata (e.g., corresponding Vdata in FIG. 4) are supplied to respective pixel driving circuits 60 corresponding to the AA 30 through the display driving circuit 50. When the gate voltage Vgate turns on the pixel driving circuit 60, it is determined whether a side of the liquid crystal layer 20 is electrically connected to the first control signal terminal X1 or the second control signal terminal X2 according to the high or low display driving voltage Vdata input from the data line DL, so as to determine whether a voltage input to the end a of the liquid crystal layer 20 and the common voltage Vcom input to the end b of the liquid crystal layer 20 have a same phase, and finally determine whether the liquid crystal molecules in the sub-pixel where the pixel driving circuit 60 is located are deflected.

Finally, by controlling the deflection of the liquid crystal molecules in the sub-pixel where the pixel driving circuit 60 is located, the brightness of the light emitted from the BLU after passing through the liquid crystal layer is controlled, and the image display of the display panel 01 is finally realized.

Moreover, by using the SRAM 62 of the MIP technology in the pixel driving circuit 60, Vdata input to the sub-pixel is stored for a certain time for display, so that a writing operation of Vdata in a frame period is not required, which avoids a plurality of writing of a data voltage, thereby significantly reducing the number of operations of the data line DL, and thus reducing power consumption.

In addition, it will be noted that the data writing circuit 61 may further include one or more switching transistors connected in parallel with the fourth transistor M4 in addition to the fourth transistor M4. Similarly, the SRAM 62 may further include one or more switching transistors connected in parallel with the first transistor M1, the second transistor M2 or the third transistor M3 in addition to the first transistor M1, the second transistor M2 and the third transistor M3. The driving circuit module 63 may further include one or more switching transistors connected in parallel with the fifth transistor M5 or the sixth transistor M6 in addition to the fifth transistor M5 and the sixth transistor M6. The above description is merely an example of the data writing circuit 61, the SRAM 62 and the driving circuit module 63, and other structures having a same function as the data writing circuit 61, the SRAM 62 or the driving circuit module 63 are not repeated here, but all shall be included in the protection scope of the present disclosure.

It will be noted that in some embodiments of the present disclosure, the transistors in the pixel driving circuits 60 and transistors in the display driving circuit 50 may be formed synchronously, and a wiring layer of the pixel driving circuits 60 and a wiring layer of the display driving circuit 50 may be manufactured by using a same patterning process. In this way, the display driving circuit 50 may be directly manufactured on the base 40 during a manufacturing process of the display panel 01, so that the bonding process of the IC is omitted, dependence on a driving IC with high cost during the manufacturing process of the display panel 01 is relieved, and moreover, narrow bezel and low power consumption are realized.

The following embodiments will be explained in an example where the display driving circuit 50 is directly manufactured on the base 40.

Hereinafter, a specific structure and a driving method of the display substrate 10 will be described in detail.

Figure 5:
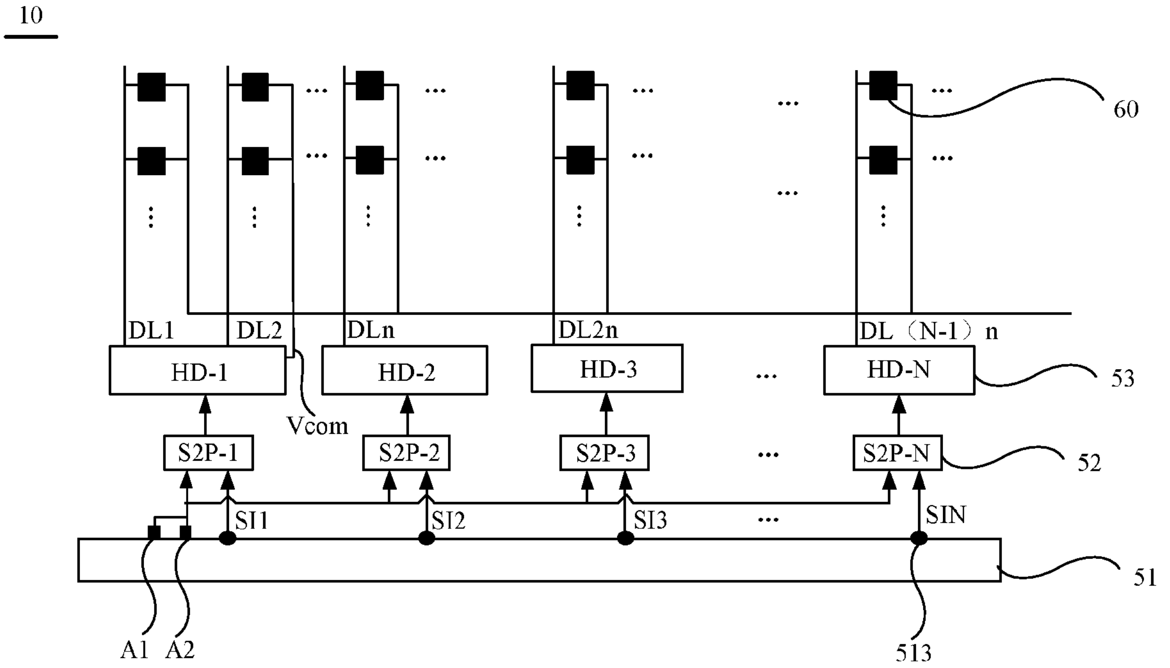
FIG. 5 is a structural diagram of a display substrate, in accordance with some embodiments of the present disclosure.

In some embodiments of the present disclosure, as shown in FIG. 5, the display driving circuit 50 may include an interface circuit 51, series-to-parallel converters (S2Ps) 52 and display driver(s) (i.e., horizontal driver(s), HD(s)) 53. The display driving circuit 50 includes at least two S2Ps 52 and at least one HD 53. For example, the interface circuit 51 may be a serial peripheral interface (SPI). The following embodiments will be explained in an example where the interface circuit 51 is the SPI.

The SPI 51 may include a clock signal terminal A1, a chip selection signal terminal A2 and N data output terminals 513. The clock signal terminal A1 is used to receive and send a clock signal (CLK), the chip selection signal terminal A2 is used to receive and send a chip selection signal (CS), and N is an integer greater than or equal to 2.

As shown in FIG. 5, the data output terminal 513 is electrically connected to the S2P 52 through a signal line SI, and the S2P 52 is electrically connected to the HD 53. For example, the data output terminal 513 is electrically connected to an S2P-1 through a signal line SI1, and the S2P-1 is electrically connected to an HD-1. In addition, the HD-1 is electrically connected to pixel driving circuits 60 through data lines DL. In addition, in order to provide target data for displaying a screen to the SPI 51, the display panel 01 may further include a master device (not shown in the figures). The master device provides the CLK and the CS to the SPI 51, and also provides frames of target data for displaying a screen.

Figure 6:
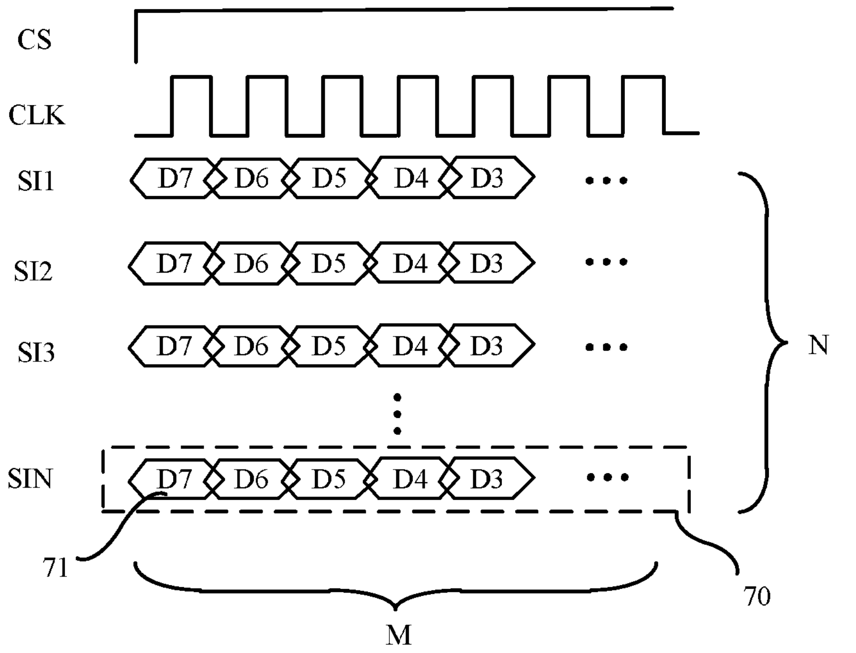
FIG. 6 is a data diagram of a frame of target data corresponding to FIG. 5.

On this basis, the SPI 51 may acquire the target data provided by the master device (not shown in the figures) according to a preset SPI protocol. The target data may be a frame of target data as shown in FIG. 6. As shown in FIG. 6, the target data may include N packets to be sent 70. A packet to be sent 70 may include M serial display data 71, where M is an integer greater than or equal to 2 (i.e., M≥2). For example, as shown in FIG. 6, the display data 71 may be D7, D6, D5, D4 . . . .

On this basis, under the action of the CLK and the CS, the SPI 51 may output the N packets to be sent 70 to the S2Ps 52 through N signal lines SI in one-to-one correspondence under an action of the CLK and the CS. Since each packet to be sent 70 includes the M serial display data 71, each S2P may receive the M serial display data 71.

It can be seen from the above that as shown in FIG. 5, the SPI 51 may output a first packet to be sent 70 to the S2P-1 through the signal line SI under the action of the CLK and the CS. Synchronously, the SPI 51 may output a second packet to be sent 70 to an S2P-2 through a signal line SI2. Synchronously, the SPI 51 may output a third packet to be sent 70 to an S2P-3 through a signal line SI3. By analogy, until the SPI 51 outputs an N-th packet to be sent 70 to an S2P-N through a signal line SIN.

After receiving the packet to be sent 70, the S2P converts the M serial display data 71 in the packet to be sent 70 into M parallel display data 71, and outputs the converted M parallel display data 71 to a corresponding HD 53.

It can be seen from the above that the S2P-1 outputs the converted M parallel display data 71 to the HD-1 through a wire. The HD-1 converts the received M parallel display data 71 into M display driving signals, and outputs the M display driving signals to pixel driving circuits 60 through data lines DL. Synchronously, the S2P-2, S2P-3 . . . S2P-N each output converted M parallel display data 71 to a respective one of HD-2, HD-3 . . . HD-N through a wire. Each HD 53 converts received M parallel display data 71 into M display driving signals, and outputs the M display driving signals to pixel driving circuits 60 through data lines DL.

Hereinafter, a driving method of the display driving circuit 50 shown in FIG. 5 for outputting the display driving signals will be described in detail with reference to FIG. 6. For the convenience of explanation, the following embodiments will be described in an example where the display driving signal is the display driving voltage Vdata. Specific steps are as follows.

Firstly, the data output terminal 513 in the SPI 51 transmits the serial display data 71 to the S2P 52.

As shown in FIG. 5, the master device (not shown in the figures) inputs the CLK and the CS through A1 and A2, and provides a frame of target data for displaying a screen on the display panel 01. The SPI 51 obtains N packets to be sent 70 in the frame of target data as shown in FIG. 6 according to the preset SPI protocol. The N packets to be sent 70 are output through N signal lines SI.

On this basis, the SPI 51 may output the N packets to be sent 70 to the N S2Ps 52 through the N signal lines SI under the action of the CLK. An output process of the N packets to be sent 70 will be explained in detail with reference to FIG. 6 below.

When the chip selection signal CS is at a high level as shown in FIG. 6, the display driving circuit 50 starts to operate. In this case, signal lines SI, such as SI1, SI2, SI3 . . . SIN, synchronously transmit respective packets to be sent 70 to respective S2Ps 52 in FIG. 5, such as S2P-1, S2P-2 . . . , and S2P-N. As shown in FIG. 6, since each packet to be sent 70 includes M display data 71, such as D7, D6, D5, D4, D3 . . . , the display data 71 changes at each rising edge of the CLK, and is read at an immediately following falling edge. N by M display data 71 may be transmitted through M changes of the CLK. Moreover, since the clock signal has timeliness, the M display data 71 output from each signal line SI are serial. Then, the M serial display data 71 are transmitted to a corresponding S2P 52 through a signal line SI. In this way, all display data 71 in the frame of target data may be output to the S2Ps 52 through the data output terminals 513.

It will be noted that in the embodiments of the present disclosure, when the chip selection signal is at a high level, the entire display driving circuit 50 starts to operate normally, which will not be repeated later.

Secondly, the S2P 52 converts the received serial display data 71 into parallel display data 71, and transmits the converted parallel display data 71 to the HD 53.

The S2P 52 converts the received M serial display data 71 into M parallel display data 71, and transmits the M parallel display data 71 to a corresponding HD 53. For example, the S2P-1 converts received M serial display data 71 into the M parallel display data 71, and transmits the M parallel display data 71 to the HD-1. Synchronously, the S2P-2, S2P-3 . . . , and S2P-N each convert received M serial display data 71 into M parallel display data 71, and each output the M parallel display data 71 to a corresponding one of HD-2, HD-3 . . . , and HD-N through a wire.

Figure 7:
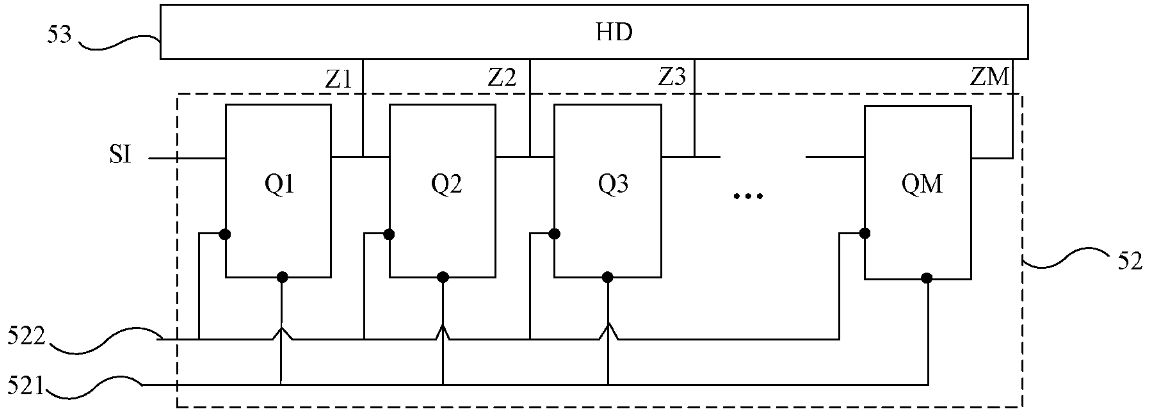
FIG. 7 is a structural diagram of a serial-to-parallel converter, in accordance with some embodiments of the present disclosure.

In some embodiments of the present disclosure, the S2P 52 in the display driving circuit 50 may include a plurality of cascaded D flip-flops, as shown in FIG. 7. An output terminal of a previous stage D flip-flop (e.g., Q1) is electrically connected to an input terminal of an adjacent next stage D flip-flop (e.g., Q2). An input terminal of a first stage D flip-flop Q1 is electrically connected to the signal line SI. An output terminal of each D flip-flop is electrically connected to a same HD 53, a clock control terminal 521 of each D flip-flop is electrically connected to A1 (as shown in FIG. 5), and a reset terminal 522 of each D flip-flop is electrically connected to A2 (as shown in FIG. 5). The clock control terminal 521 of each D flip-flop receives the CLK from A1, and the reset terminal 522 of each D flip-flop receives the CS from A2.

Figure 8:
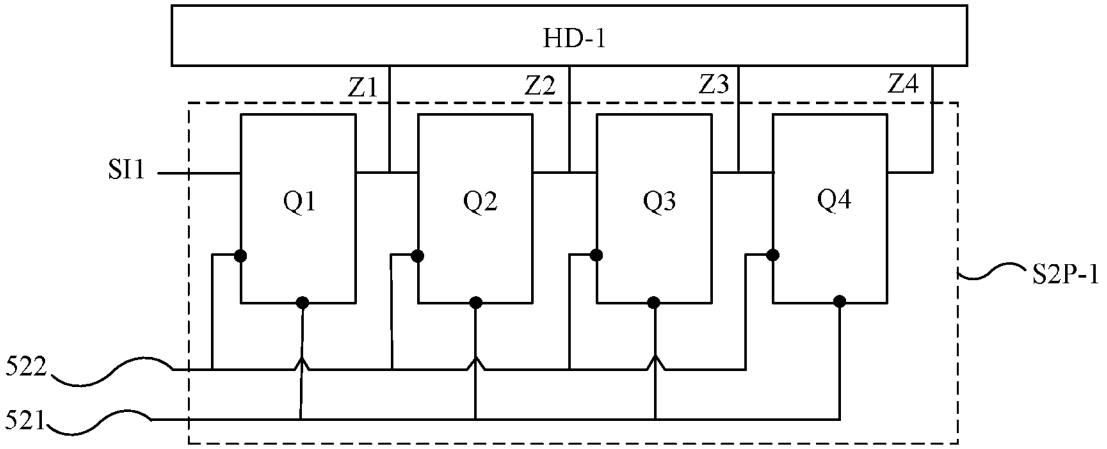
FIG. 8 is a structural diagram of a specific serial-to-parallel converter corresponding to FIG. 7.

Hereinafter, for the convenience of description, the number M of D flip-flops is set to 4, as shown in FIG. 8. The operating principle of the cascaded D flip-flops will be explained with reference to the timing diagram in FIG. 9 corresponding to the specific structure of the S2P 52 in FIG. 8.

As shown in FIG. 8, the S2P-1 is composed of four cascaded D flip-flops Q1, Q2, Q3 and Q4. An input terminal of Q1 is electrically connected to the signal line SI1, and an output terminal of Q1 is connected to an input terminal of Q2, and is further electrically connected to the HD-1 through a signal line Z1. The input terminal of Q2 is electrically connected to the output terminal of Q1, and an output terminal of Q2 is connected to an input terminal of Q3, and is further electrically connected to the HD-1 through a signal line Z2. Connections of Q3 and Q4 are similar to that of Q2, which will not be repeated here. It will be noted that an output terminal of Q4 is merely electrically connected to the HD-1 in this case.

Figure 9:
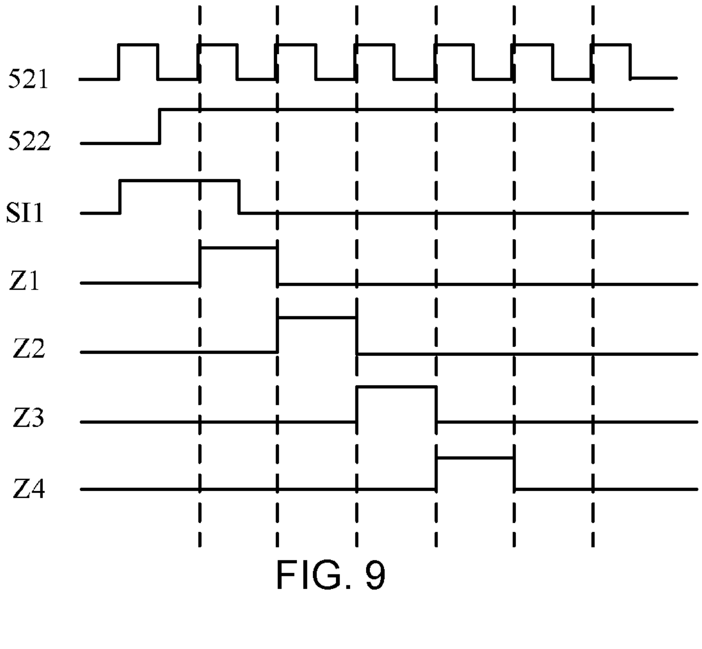
FIG. 9 is a timing diagram corresponding to the serial-to-parallel converter in FIG. 8.

It can be seen from the above that the signal line SI1 transmits 4 serial display data 71 to the input terminal of Q1, and in this case, all D flip-flops are controlled by the same clock signal, as shown in FIG. 9, so that first input data are sequentially collected by all the D flip-flops when rising edges of the clock signal arrive. When a fourth rising edge of the clock signal arrives, data collected by the 4 D flip-flops may be output synchronously through wires (e.g., Z1, Z2, Z3 and Z4), thereby realizing the conversion of 4 serial data into 4 parallel data.

It will be noted that the number of D flip-flops is not limited. The above description in which 4 cascaded D flip-flops are used in the S2P 52 is an example, but the number of the D flip-flops is not limited thereto, and is determined according to actual display requirements.

In this way, through M cascaded D flip-flops, it is possible to convert the M serial display data 71 into the M parallel display data 71.

Finally, the HD 53 receives the parallel display data 71 output from the S2P 52, converts the received parallel display data 71 into display driving voltages Vdata, and outputs the display driving voltages Vdata to pixel driving circuits 60 through data lines DL.

Since a data processing amount of the S2Ps 52 in the display driving circuit 50 is largest, a data processing rate of the S2P 52 determines a data processing rate of the display driving circuit 50. A limit data processing rate $Fclk_{max}$ of the S2P 52 has a following formula:

$$Fclk_{max}=K\times C\times FR\times R \quad (1).$$

Here, K is a proportionality coefficient that is a constant. For example, K may be 3.23 (1/bit). C is a color depth, and the unit is bit. FR is a maximum frame frequency in Hz. R is a resolution product, i.e., the number of sub-pixels.

It can be seen from the formula (1) that in a case where other conditions of the display panel 01 remain unchanged, the limit data processing rate $Fclk_{max}$ of the S2Ps 52 is proportional to the maximum frame frequency FR. That is, the larger the $Fclk_{max}$, the larger the FR. Moreover, the larger the $Fclk_{max}$, the shorter the duration $T_{fr}$ required to refresh each frame. The duration $T_{fr}$ required to refresh each frame and the maximum frame frequency FR have a following corresponding relationship:

$$T_{fr}=1/FR \quad (2).$$

In addition, assuming that the number of display data is D_Data, the number of signal lines SI is D_SI, and the number of screen rows of the display panel 01 is D_A, a following calculation formula may be obtained:

$$T_{fr}=1/FR=(D\_\text{Data}\times D\_A)/(D\_SI\times Fclk) \quad (3);$$

$$FR=(D\_SI\times Fclk)/(D\_\text{Data}\times D\_A) \quad (4).$$

It can be known from the formula (3) or the formula (4) that the number D_SI of signal lines SI is proportional to the maximum frame frequency FR. That is, in a case where other conditions of the display panel 01 are determined, the lager the number D_SI of signal lines SI is, the larger the maximum frame frequency FR is, then the shorter the duration $T_{fr}$ required to refresh each frame is, and the higher the fluency of the display screen of the display panel 01 is.

In some embodiments of the present disclosure, it can be known from the above analysis that in the case where the other conditions remain unchanged, by providing the N S2Ps 52 and the N signal lines SI in one-to-one correspondence (for example, as shown in FIG. 5, the S2P-1, S2P-2, S2P-3 . . . S2P-N correspond to the SI1, SI2, SI3 . . . SIN respectively, where N is greater than or equal to 2), the duration required for the display panel 01 to refresh each frame may be significantly shortened, and thus fluent dynamic display screens are obtained, so as to meet wide user requirements.

It will be noted that the number of S2Ps 52 is not limited, which is determined according to the actual display requirements of the display panel 01. Moreover, the other conditions of the display panel 01 indicated in the above embodiments may be a size, color depth, and resolution of the display panel 01.

It can be known from the above that only when pixel driving circuits 60 in a certain row or rows are specified to be gated, the generated display driving voltages Vdata are written, so that the display panel 01 displays a screen. Therefore, in order to realize the gating of pixel driving circuits 60 in at least one row, in some embodiments of the present disclosure, the SPI 51 may further obtain address information 80 of target data. The target data may be the frame of target data as shown in FIG. 10 or 11.

Hereinafter, the display driving circuit 50 and a driving method for generating the gate voltage will be described in detail.

Figure 10:
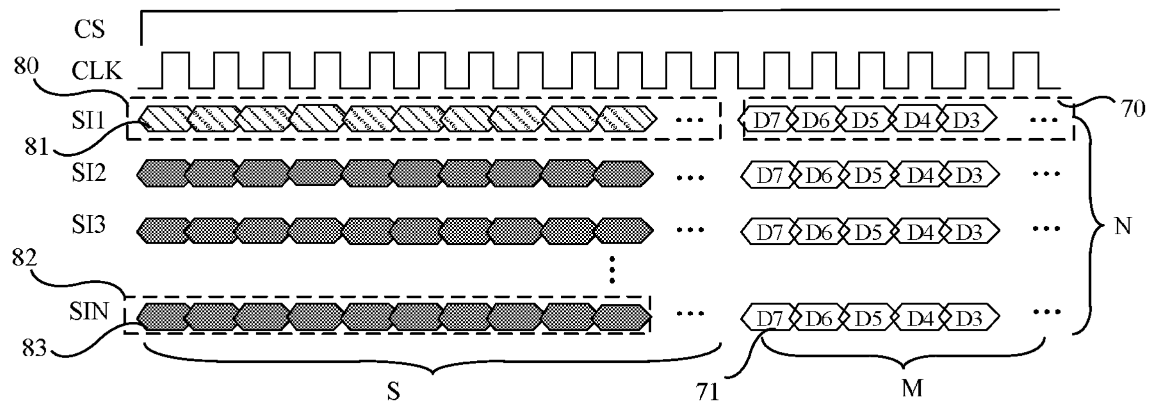
FIG. 10 is a data diagram of another frame of target data, in accordance with some embodiments of the present disclosure.
Figure 11:
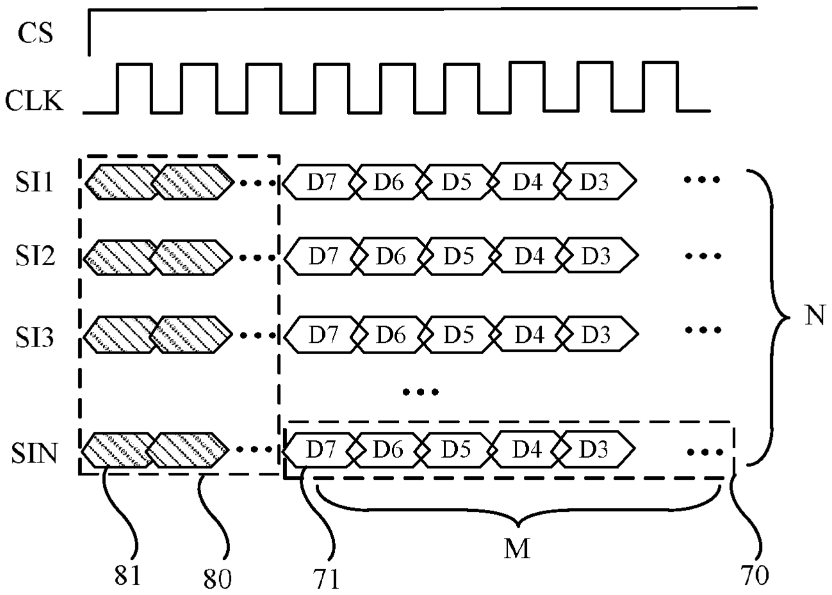
FIG. 11 is a data diagram of yet another frame of target data, in accordance with some embodiments of the present disclosure.

In some embodiments of the present disclosure, the SPI 51 in the display driving circuit 50 further obtains the address information 80 in the frame of target data as shown in FIG. 10 or 11. The address information 80 includes S address data 81, and S is an integer greater than or equal to 2 (i.e., S≥2). In this case, the data output terminal(s) 513 of the SPI 51 further output the S address data 81 through the signal line(s) SI under the action of the CLK.

It will be noted that FIGS. 10 and 11 merely show two kinds of target data that are set according to different SPI protocols, and the target data is not limited thereto.

An output mode of the S address data 81 is related to an arrangement of the address data 81 in the frame of target data. The output mode of the S address data 81 will be exemplarily described below according to different arrangements of the address data 81 in the frame of target data.

For example, in some embodiments of the present disclosure, as shown in FIG. 10, the frame of target data further includes one address information 80 and (N−1) blank information 82 in addition to the N packets to be sent 70. The address information 80 includes S serial address data 81. One blank information 82 includes S serial blank data 83.

Figure 12:
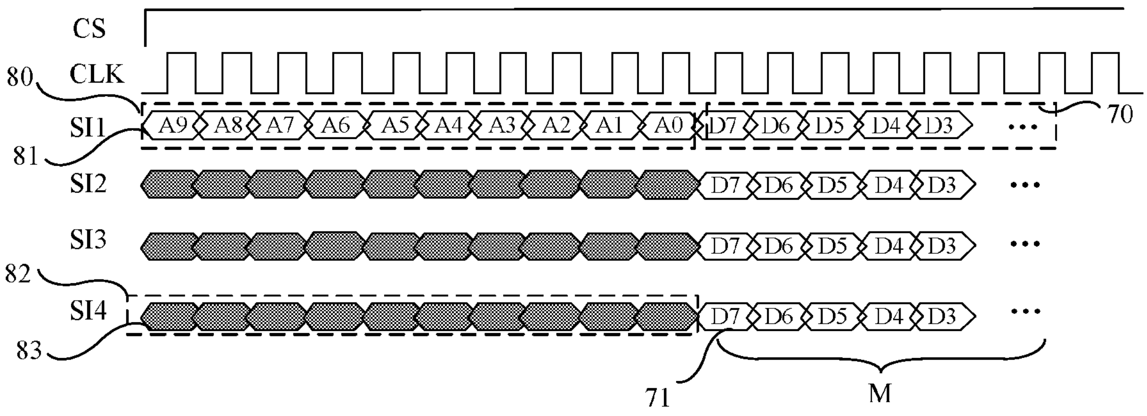
FIG. 12 is a data diagram of a frame of specific target data corresponding to FIG. 10.

Hereinafter, for the convenience of description, for example, N is set to 4, and S is set to 10. As shown in FIG. 12, the address information 80 includes 10 serial address data 81, e.g., A9 to A0 as shown in FIG. 12. The blank information 82 includes 10 serial blank data 83.

Figure 13:
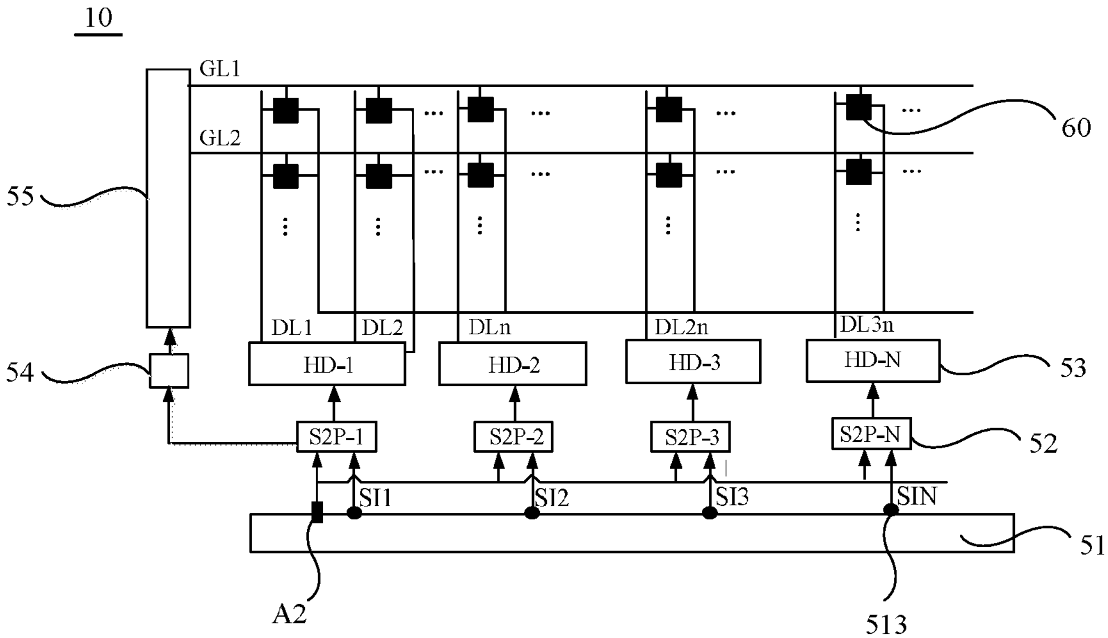
FIG. 13 is a structural diagram of a display substrate corresponding to FIG. 12.

FIG. 13 is a display substrate 10 corresponding to the target data shown in FIG. 12. It can be known from the above that under the action of the CLK, the 10 serial address data A9 to A0 may be all output to the S2P-1 only through the signal line SI1.

In addition, it can be known with reference to FIG. 12 that under the action of the CLK, the 10 serial address data 81 are output through the signal line SI1. Synchronously, under an action of the CLK, other signal lines, such as the SI2, SI3 and SI4, each output 10 serial blank data 83 to a respective one of S2P-2, S2P-3 and S2P-4.

On this basis, the S2P-1 further converts the received 10 serial address data 81 into 10 parallel address data 81 under the action of the CLK.

In addition, in order to receive the S parallel address data 81 obtained by the conversion of the S2P-1, in some embodiments of the present disclosure, as shown in FIG. 13, the display driving circuit 50 may further include a decoder 54. The decoder 54 is electrically connected to the S2P-1, and receives the S parallel address data 81 output from the S2P-1, and generates a corresponding row gate signal according to received address information including the S parallel address data 81.

On this basis, in order to realize the gating of pixel driving circuits 60 in a certain row or rows, the display driving circuit 50 may further include a gate circuit 55. As shown in FIG. 13, the gate circuit 55 is electrically connected to the decoder 54, and receives the row gate signal from the decoder 54, and outputs the row gate signal to at least one gate signal line GL. For the convenience of explanation, the following embodiments will be described in an example where the row gate signal is a gate voltage Vgate.

It will be noted that through the signal line SI, the data output terminal 513 of the SPI 51 firstly outputs the address information 80, and secondly outputs the packet to be sent 70. That is, through the signal line SI1, the data output terminal 513 of the SPI-1 firstly outputs the 10 serial address data 81, and secondly outputs the packet to be sent 70.

It will be noted that the clock signal terminal A1 and the chip selection signal terminal A2 are two independent terminals for outputting the independent CLK and CS, respectively. In order to simplify the accompanying drawings, the clock signal terminal and the chip selection signal terminal are represented by a same terminal A below.

Hereinafter, a specific process in which the display driving circuit 50 may further generate the gate voltage Vgate will be described in detail with reference to FIGS. 12 and 13.

Firstly, before the SPI 51 transmits the serial display data 71 to the S2P 52 through the signal line SI, the SPI 51 further transmits the serial address data 81 to the S2P 52 through the signal line SI.

For example, when the chip selection signal is at a high level as shown in FIG. 12, the display driving circuit 50 starts to operate. In this case, the signal lines SI, such as the SI1, SI2, SI3 and SI4, firstly output the address information 80 and the 3 blank information 82 to the S2Ps 52 in FIG. 13, such as the S2P-1, S2P-2, S2P-3 and S2P-4, respectively. As shown in FIG. 12, the address information 80 includes 10 serial address data 81, such as A9 to A0, the 3 blank information 82 each include 10 serial blank data 83, and the address data 81 and the blank data 83 are changed at each rising edge of the CLK, and are read at an immediately following falling edge. The 10 address data 81 and the 3 blank information 82 each including 10 blank data 83 may be transmitted through 10 changes of the CLK. Moreover, since the clock signal has the timeliness, the 10 address data 81 are serial.

It will be noted that in some embodiments of the present disclosure, all the address data 81 may be output through the signal line SI1 or through any one of the signal lines SI2, SI3 . . . , and SIN. A position of the address information in the frame of target data in FIG. 10 or FIG. 12 is merely an exemplary illustration, and the position is not limited thereto.

In this way, a purpose of transmitting the 10 serial address data 81 in the frame of target data to the S2P 52 through the data output terminal 513 of the SPI 51 is achieved.

It will be noted that in the above embodiments, the number of address data corresponding to FIG. 12 is set to 10, i.e., A9 to A0, which is merely an exemplary illustration, and the number is not limited thereto.

Secondly, the S2P 52 converts the 10 received serial address data 81 into the 10 parallel address data 81, and outputs the 10 parallel address data 81 to the decoder 54.

It will be noted that a process of using the S2P-1 to convert the 10 serial address data 81 into the 10 parallel address data 81 is similar to the process of using the S2P 52 to convert the M serial display data 71 into the M parallel display data 71, and thus will not be repeated here.

Next, the decoder 54 is used to receive the 10 parallel address data 81 output from the S2P, generate a corresponding row gate signal according to the address information composed of the 10 parallel address data 81, and output the generated row gate signal to the gate circuit 55.

Finally, the gate circuit 55 outputs the gate voltage Vgate to one or several specified gate lines GL according to the received row gate signal, thereby gating pixel driving circuits in a specified row or rows.

In this way, it can be known from the operating principle of the pixel driving circuit 60 that only when the gate voltage Vgate (e.g., Vgate corresponding to FIG. 4) is output to the one or several gate signal lines GL to turn on the pixel driving circuits in the specified row or rows, the deflection of the liquid crystal molecules in the sub-pixel where the pixel driving circuit 60 is located is able to be controlled in combination with the display driving voltage Vdata (e.g., Vdata corresponding to FIG. 4) transmitted through the data line DL, so as to control the brightness of the light emitted from the BLU after passing through the liquid crystal layer, and finally realize the image display of the display panel 01.

Moreover, the data output terminal 513 in the display driving circuit 50 outputs all the address data to the decoder 54, and only a corresponding wire (as shown in FIG. 13) is required, so that a wiring arrangement in the display driving circuit 50 is simplified, and thus a wiring space on the display substrate is optimized, and the overall power consumption of the display panel 01 is reduced. In addition, the display driving circuit 50 is directly formed on the base 40, so that the bonding process of the driving IC may be omitted, thereby reducing the process cost and increasing the yield.

For another example, in some other embodiments of the present disclosure, the frame of target data associated with another SPI protocol is shown in FIG. 11. The frame of target data further includes address information 80 in addition to the N packets to be sent 70. The address information 80 includes S address data 81, and the S address data 81 are divided into N portions. Each portion includes at least two serial address data 81. The N portions each including the at least two address data 81 and the N by M display data 71 are output through the N signal lines SI.

It will be noted that the address data 81 output through different signal lines SI are different, but the total number of the address data 81 output through all the signal lines SI is S. Moreover, it will be noted that through the signal lines SI, the data output terminals 513 of the SPI 51 firstly output the address information 80, and secondly output the packets to be sent 70.

Figure 14:
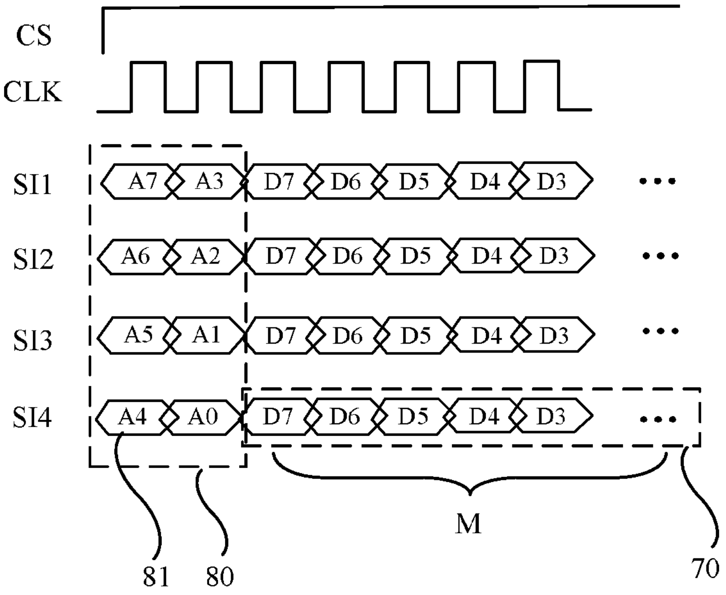
FIG. 14 is a data diagram of a frame of specific target data corresponding to FIG. 11.

For the convenience of description, for example, as shown in FIG. 14, N is set to 4, and S is set to 8. The 8 address data 81 are A7 to A0. In this case, the 4 signal lines, such as the SI1, SI2, SI3 and SI4, each output two serial address data 81 under the action of the CLK. The address data 81 output through the signal lines SI are different. As shown in FIG. 14, the SI1 outputs the address data A7 and A3, the SI2 outputs the address data A6 and A2, the SI3 outputs the address data A5 and A1, and the SI4 outputs the address data A4 and A0.

Figure 15:
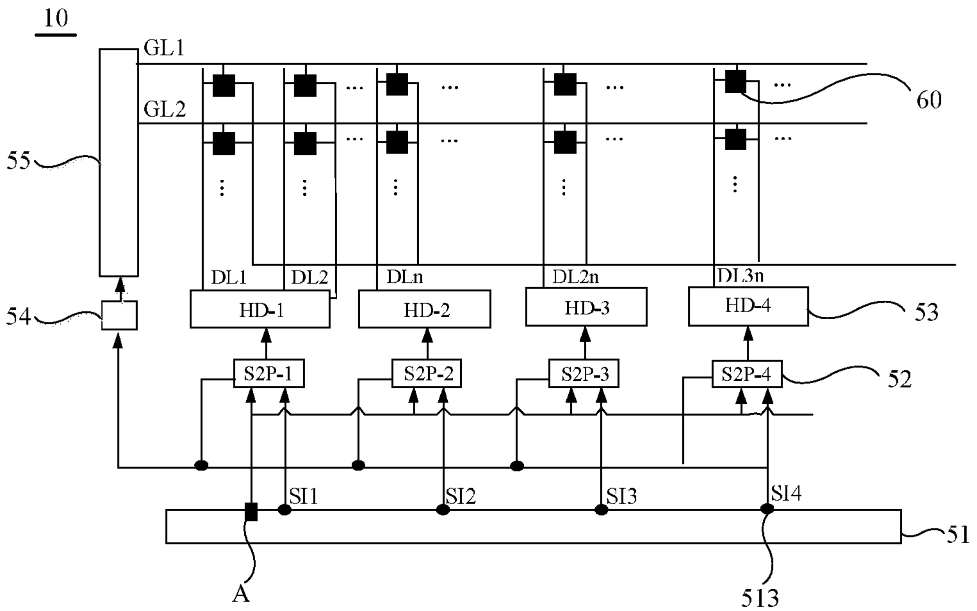
FIG. 15 is a structural diagram of a display substrate corresponding to FIG. 14.

It can be seen from FIGS. 14 and 15 that the SI1 may output the address data A7 and A3 to the S2P-1, the SI2 may output the address data A6 and A2 to the S2P-2, the SI3 may output the address data A5 and A1 to the S2P-3, and the SI4 may output the address data A4 and A0 to the S2P-4. In this case, after each signal line outputs two serial address data 81 to a respective S2P 52, the S2P 52 converts the two serial address data 81 into two parallel address data 81.

In order to receive the parallel address data 81 output from the S2Ps 52, such as the S2P-1, S2P-2, S2P-3 and S2P-4, in some embodiments of the present disclosure, as shown in FIG. 15, the display driving circuit 50 may further include a decoder 54. The decoder 54 is electrically connected to the 4 S2Ps 52, and receives the 8 parallel address data 81 output from the 4 S2Ps, and generates a row gate signal according to the received address information including the 8 parallel address data 81.

On this basis, in order to realize the gating of pixel driving circuits 60 in a certain row or rows, the display driving circuit 50 may further include a gate circuit 55. As shown in FIG. 15, the gate circuit 55 is electrically connected to the decoder 54, and receives the row gate signal from the decoder 54, and outputs a gate voltage Vgate to a gate signal line GL according to the row gate signal.

In this way, the gating of the pixel driving circuits 60 in the certain row or rows in the AA is realized. Moreover, since the N portions each including the at least two parallel address data 81 share the decoder 54, so that the wiring arrangement in the display driving circuit 50 is simplified, and thus the wiring space on the display substrate is optimized.

Hereinafter, a specific process in which the display driving circuit 50 may further generate the gate voltage Vgate will be described in detail with reference to FIGS. 14 and 15.

Firstly, before the SPI 51 transmits the serial display data 71 to the S2P 52 through the signal line SI, the SPI 51 further transmits the serial address data 81 to the S2P 52 through the signal line SI.

For example, as shown in FIG. 14, when the chip selection signal is at a high level, the display driving circuit 50 starts to operate. In this case, the signal lines SI, such as the SI1, SI2, SI3 and SI4, each firstly transmit two address data 81 to a respective one of S2Ps 52 in FIG. 15, such as the S2P-1, S2P-2, S2P-3 and S2P-4. The signal line SI transmits two address data 81, and address data 81 is changed at each rising edge of the CLK, and is read at an immediately following falling edge. The 4 signal lines may transmit respective two address data 81 synchronously through 2 changes of the CLK. Moreover, since the clock signal has the timeliness, the two address data 81 are serial. Finally, the 8 address data 81 transmitted synchronously through the 4 signal lines are output to the 4 S2Ps 52.

In this way, a purpose of transmitting all the address data 81 in the frame of target data to the S2Ps 52 through the N data output terminals 513 of the SPI 51 is achieved.

It will be noted that N is set to 4 and S is set to 8, which are an exemplary description in the embodiments of the present disclosure, and the numbers are not limited thereto, depending on actual situation.

Secondly, the S2P 52 converts the received serial address data 81 into parallel address data 81, and outputs the parallel address data 81 to the decoder 54.

It will be noted that a process of using the S2P 52 to convert the two serial address data 81 into two parallel address data 81 is similar to the process of using the S2P 52 to convert the M serial display data 71 into the M parallel display data, and thus will not be repeated here.

Next, the decoder 54 is used to receive two parallel address data 81 output from each S2P 52, generate a corresponding row gate signal according to all the received address data 81, and output the generated row gate signal to the gate circuit 55.

Finally, the gate circuit 55 outputs a gate voltage Vgate to one or several specified gate signal lines GL according to the received row gate signal, thereby gating pixel driving circuits in the specified row or rows.

In this way, it can be known from the operating principle of the pixel driving circuit 60 that when the gate voltage Vgate (e.g., Vgate corresponding to FIG. 4) is output to the one or several specified gate signal lines GL to turn on the pixel driving circuits in the specified row or rows, the deflection of the liquid crystal molecules in the sub-pixel where the pixel driving circuit 60 is located is able to be controlled in combination with the display driving voltage Vdata (e.g., Vdata corresponding to FIG. 4) transmitted through the data line DL, so as to control the brightness of the light emitted from the BLU after passing through the liquid crystal layer, and finally realize the image display of the display panel 01.

Moreover, the S address data 81 are output to the N S2Ps 52 through the N signal lines SI, and the N S2Ps 52 are each used to convert serial address data 81 into parallel address data 81, so that the operating efficiency of the display driving circuit 50 may be greatly improved.

It will be noted that each signal line SI only transmits two serial address data 81, which is merely an exemplary description, and each signal line SI transmits at least two serial address data 81. It will be noted that in the display driving circuit 50, materials and sizes of wires that connect various portions are not limited. Moreover, for two unconnected wires, in a case where orthographic projections of the two unconnected wires on the base 40 are overlapped with each other, the two unconnected wires have an insulating layer therebetween. The number of the film layers and material of the insulating layer are not limited.

On this basis, in some other embodiments of the present disclosure, in order to realize other functions of the display substrate 10, the SPI 51 may further obtain mode information 90 in the target data. The target data may be a frame of target data as shown in FIG. 16 or 17.

Hereinafter, the display driving circuit 50 and a driving method will be described in detail.

Figure 16:
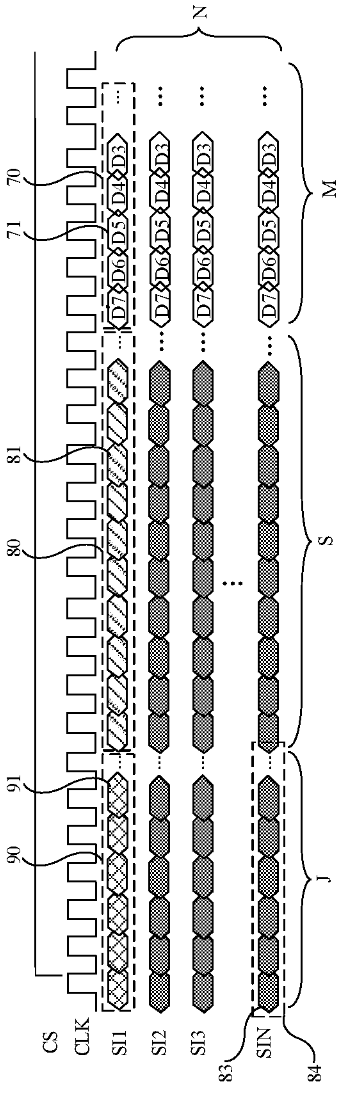
FIG. 16 is a data diagram of yet another frame of target data, in accordance with some embodiments of the present disclosure.
Figure 17:
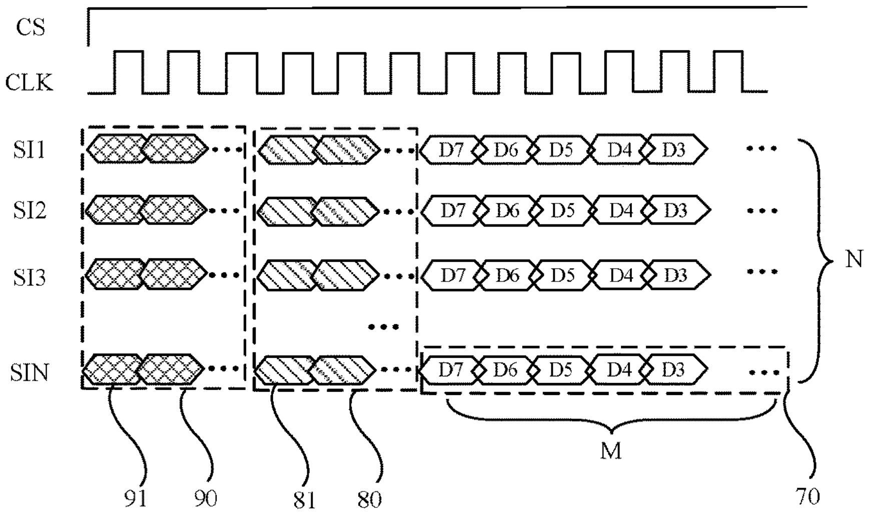
FIG. 17 is a data diagram of yet another frame of target data, in accordance with some embodiments of the present disclosure.

In some embodiments of the present disclosure, the SPI 51 in the display driving circuit 50 further obtains the mode information 90 in the frame of target data as shown in FIG. 16 or 17. The mode information 90 may include J mode data 91, and J is an integer greater than or equal to 2 (i.e., J≥2). In this case, the data output terminal(s) 513 of the SPI 51 further output the J mode data 91 through the signal line(s) SI under the action of the CLK.

It will be noted that FIGS. 16 and 17 merely show two kinds of target data that are set according to different SPI protocols, and the target data is not limited thereto.

An output mode of the J mode data 91 is related to an arrangement of the mode data 91 in the frame of target data. The output mode of the J mode data 91 will be exemplarily described below according to different arrangements of the mode data 91 in the frame of target data.

For example, for the convenience of description, the following description will be made in an example where all the serial address data 81 are output from one data output terminal 513. In some embodiments of the present disclosure, as shown in FIG. 16, the frame of target data further includes mode information 90. The mode information 90 includes J serial mode data 91.

Figure 18:
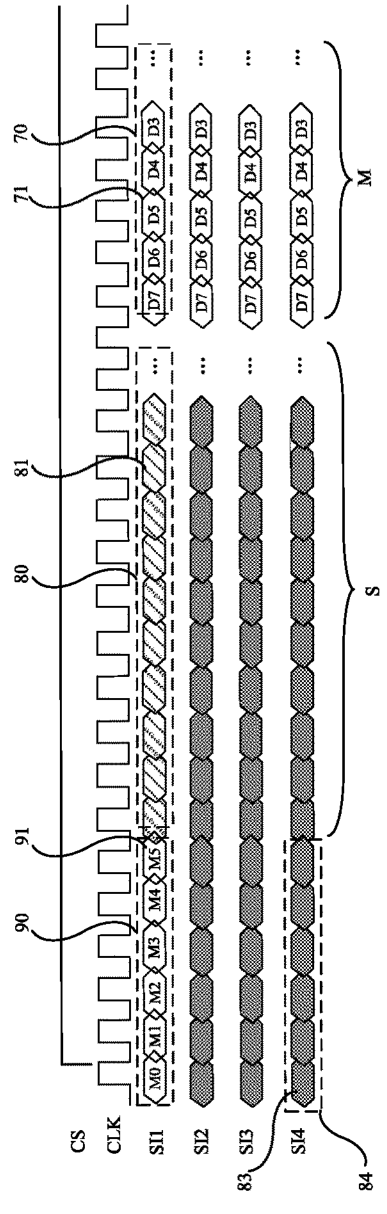
FIG. 18 is a data diagram of a frame of specific target data corresponding to FIG. 16.

For the convenience of description, for example, as shown in FIG. 18, N is set to 4, and J is set to 6. The frame of target data further includes the mode information 90 in addition to 4 packets to be sent 70, the address information 80, 3 blank information 82 and 3 blank information 84. The address information 80 includes the S serial address data 81. One blank information 82 includes S blank data 83. One blank information 84 includes J (e.g., J is 6 here) serial blank data 83. The mode information 90 includes 6 serial mode data 91, which are M0 to M5.

On this basis, as shown in FIG. 18, under the action of the CLK, the serial mode data M0, M1, M2, M3, M4 and M5 may be all output through the signal line SI1.

Figure 19:
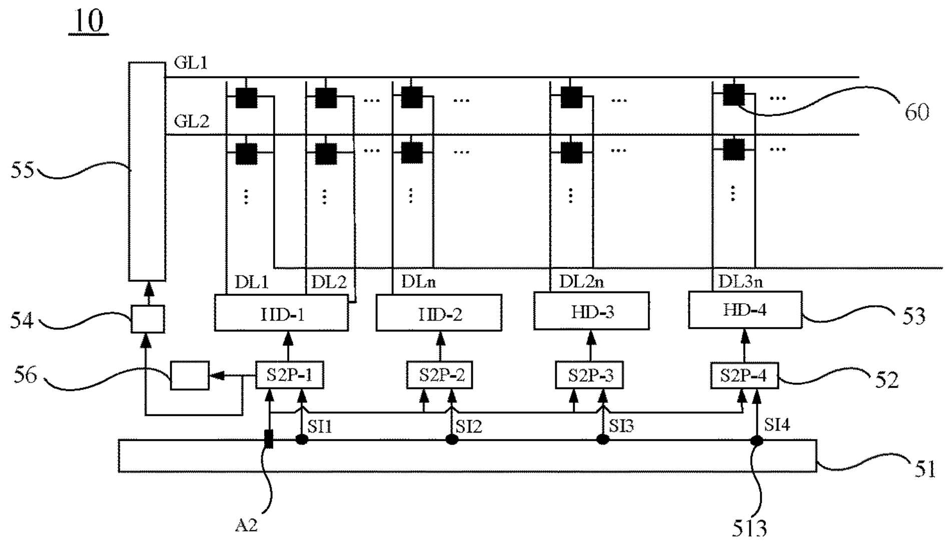
FIG. 19 is a structural diagram of a display substrate corresponding to FIG. 18.

On this basis, as shown in FIG. 19, the 6 serial mode data 91 are output to the S2P-1 under the action of the CLK through the signal line SI1. When receiving the 6 serial mode data 91, the S2P-1 converts the 6 serial mode data 91 into 6 parallel mode data 91 under the action of the CLK.

It will be noted that in some embodiments of the present disclosure, all the mode data 91 may be output through the signal line SI1 or through any one of the signal lines SI2, SI3 . . . , and SIN. A position of the mode information in the frame of target data shown in FIG. 16 or FIG. 18 is merely an exemplary illustration, and the position is not limited thereto.

It will be noted that an output order of the address information 80 and the mode information 90 is not limited. That is, the data output terminal 513 of the SPI 51 may firstly output the mode information 90, then output the address information 80, and finally output the packet to be sent 70. Alternatively, the address information 80 is firstly output, then the mode information 90 is output, and finally the packet to be sent 70 is output. Moreover, the specific number of the mode data 91 in the mode information 90, the specific number of the display data 71 in the packet to be sent 70, and the specific number of the address data 81 in the address information 80 are not limited, and are determined according to the actual display requirements.

It will be noted that since the number of display data 71 is much greater than the number of mode data 91 and the number of address data 81, and in this case, accordingly, a formula (5) is as follows:

$$T_{fr} = 1/FR = \left(J + S + \frac{\text{D\_Data}}{\text{D\_SI}}\right) \times \frac{\text{D\_A}}{Fclk}. \tag{5}$$

The formula (5) may also be converted to the formula (3) or (4). That is, $T_{fr}$=1/FR=(D_Data×D_A)/(D_SI×Fclk), or FR=(D_SI×Fclk)/(D_Data×D_A), which indicates that the number D_SI of signal lines SI is still proportional to the maximum frame frequency FR. Therefore, in a case where the frame of target data further includes the address data 81 and the mode data 91, the duration required for the display panel 01 to refresh each frame is also significantly shortened due to the existence of the N signal lines SI, and thus fluent dynamic display screens are obtained, so as to meet wide user requirements.

On this basis, in order to receive the 6 parallel mode data 91 obtained by the conversion of the S2P-1, in some embodiments of the present disclosure, as shown in FIG. 19, the display driving circuit 50 may further include a mode controller 56.

The mode controller 56 is electrically connected to the S2P-1, and receives the 6 parallel mode data 91 obtained by the conversion of the S2P-1.

For example, the mode controller 56 may be further electrically connected to the first control signal terminal X1 (in the pixel driving circuit 60, as shown in FIG. 3) and the second control signal terminal X2 (in the pixel driving circuit 60, as shown in FIG. 3), and electrically connects the first control signal terminal X1 and the second control signal terminal X2 according to the received mode information including the 6 parallel mode data, so that the first control signal terminal X1 and the second control signal terminal X2 that are short-circuited each output a voltage waveform consistent with a waveform of the common voltage Vcom. That is, the voltage difference between the two ends of the liquid crystal layer 20 is 0, so that the display panel 01 displays a completely black screen.

It will be noted that the first control signal terminal X1 is used to provide a first inversion voltage V1 to liquid crystal molecules in the display panel 01. The second control signal terminal X2 is used to provide a second inversion voltage V2 to the liquid crystal molecules in the display panel 01. The first inversion voltage V1 and the second inversion voltage V2 have opposite polarities.

It will be noted that the mode controller 56 is electrically connected to the first control signal terminal X1 and the second control signal terminal X2, and electrically connects the first control signal terminal X1 and the second control signal terminal X2 according to the received mode information, which is merely an example, which is not limited.

Hereinafter, a specific process in which the display driving circuit 50 may further realize mode control will be described in detail with reference to FIGS. 18 and 19.

Firstly, before the SPI 51 transmits the serial display data 71 to the S2P 52 through the signal line SI, the SPI 51 transmits the serial mode data 91 to the S2P 52 through the signal line SI.

For example, when the chip selection signal is at a high level as shown in FIG. 18, the display driving circuit 50 starts to operate. In this case, the signal lines SI, such as the SI1, SI2, SI3 and SI4, firstly output the mode information 90 and the 3 blank information 84 to the S2Ps 52 in FIG. 19, such as the S2P-1, S2P-2, S2P-3 and S2P-4, respectively. As shown in FIG. 18, the mode information 90 includes 6 serial mode data M0 to M5, and the blank information 84 includes 6 serial blank data 83 corresponding to the mode data. The mode data 91 and the blank data 83 are changed at each rising edge of the CLK, and are read at an immediately following falling edge. The 6 mode data 91 and the 3 blank information 84 each including the 6 blank data 83 may be transmitted through 6 changes of the CLK. Moreover, since the clock signal has the timeliness, the 6 mode data 91 are serial. Finally, the signal line SI1 outputs the mode information 90 including the 6 serial mode data 91 to the S2P-1, and the 3 signal lines SI, such as the SI2, SI3 and SI4, output the 3 blank information 84 each including the 6 serial blank data 83 to corresponding S2Ps 52, such as the S2P-2, S2P-3 and S2P-4, respectively.

In this way, a purpose of transmitting the 6 serial mode data 91 in the frame of target data to the S2P 52 (e.g., the S2P-1 shown in FIG. 19) through the data output terminal 513 of the SPI 51 is achieved.

Secondly, the S2P-1 converts the received 6 serial mode data 91 into 6 parallel mode data 91.

It will be noted that a process of using the S2P-1 to convert the 6 serial mode data 91 into the 6 parallel mode data 91 is similar to the process of using the S2P 52 to convert the M serial display data 71 into the M parallel display data 71, which will not be repeated here.

Finally, the mode controller 56 is used to receive the 6 parallel mode data 91 output from the S2P-1, and electrically connect the first control signal terminal X1 and the second control signal terminal X2 according to the 6 parallel mode data 91.

In this way, the mode controller 56 electrically connects the first control signal terminal X1 and the second control signal terminal X2 according to the J parallel mode data 91, so that the first control signal terminal X1 and the second control signal terminal X2 that are short-circuited each output the voltage waveform consistent with the waveform of the common voltage Vcom. That is, the voltage difference between the two ends of the liquid crystal layer 20 is 0, so that the display panel 01 displays a completely black screen.

Moreover, since only a wire is required to output the J parallel mode data 91 from the S2P to the mode controller 56, the wiring arrangement in the display driving circuit 50 is simplified, and thus the wiring space on the display substrate is optimized.

It will be noted that in the embodiments, the number of the mode data 91 is set to 6, which is merely an exemplary description, the number is not limited thereto.

For another example, in some other embodiments of the present disclosure, the frame of target data associated with another SPI protocol is shown in FIG. 17. The frame of target data further includes the mode information 90 in addition to the N packets to be sent 70 and the address information 80. The mode information 90 includes J mode data 91, and the J mode data 91 are divided into N portions. Each portion includes at least two serial mode data 91. The N portions each including the at least two mode data 91, the N portions each including the at least two address data 81 and the N by M display data 71 are output through the N signal lines SI.

It will be noted that the mode data 91 output through different signal lines SI are different, but the total number of the mode data 91 output through all the signal lines SI is J. Moreover, it will be noted that through the signal line SI, the data output terminal 513 of the SPI 51 firstly outputs the serial mode data 91, and secondly outputs the packet to be sent 70. It will be noted that an output order of the mode data 91 and the address data 81 is not limited. The output order of the mode data 91 and the address data 81 in the frame of target data shown in FIG. 17 is merely an example. In some other embodiments of the present disclosure, the address data 81 may be output firstly, and then the mode data 91 are output.

For the convenience of description, the following description will be made in an example where all the address data 81 are output from the N data output terminals 513.

Figure 20:
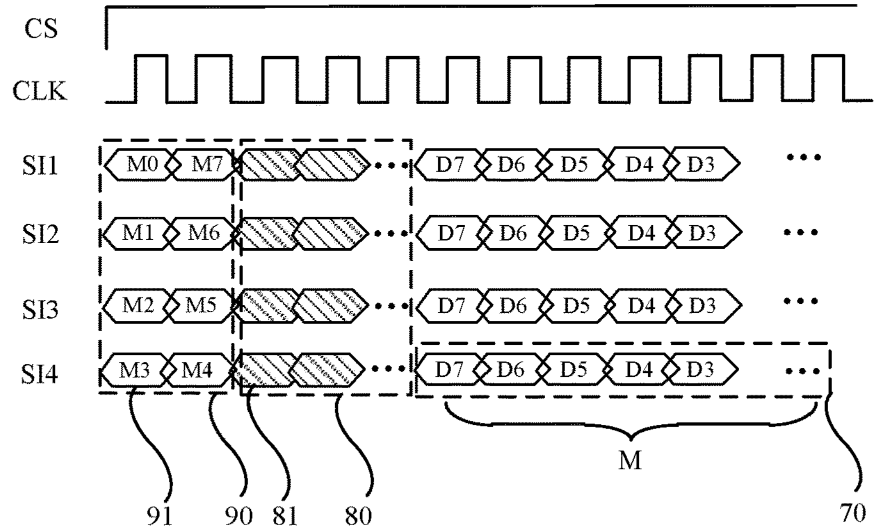
FIG. 20 is a data diagram of a frame of specific target data corresponding to FIG. 17.
Figure 21:
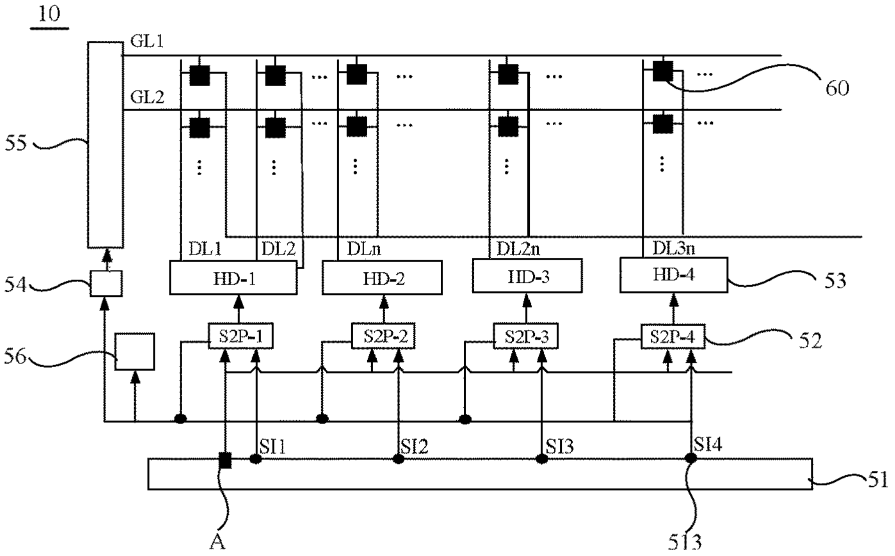
FIG. 21 is a structural diagram of a display substrate corresponding to FIG. 20.

For example, as shown in FIG. 20, N is set to 4, and J is set to 8. The 8 mode data 91 are M7 to M0. In this case, the 4 signal lines, such as the SI1, SI2, SI3 and SI4, each output two serial mode data 91 under the action of the CLK. The mode data 91 output through the signal lines SI are different. As shown in FIG. 21, the SI1 outputs the mode data M7 and M0, the SI2 outputs the mode data M1 and M6, the SI3 outputs the mode data M2 and M5, and the SI4 outputs the mode data M3 and M4.

It can be seen from FIG. 21 that the SI1 may output the mode data M7 and M0 to the S2P-1, the SI2 may output the mode data M1 and M6 to the S2P-2, the SI3 may output the mode data M2 and M5 to the S2P-3, and the SI4 may output the mode data M3 and M4 to the S2P-4. In this case, after each signal line outputs two serial mode data 91 to a corresponding S2P 52, the S2P 52 converts the two serial mode data 91 into two parallel mode data 91.

In order to receive the parallel mode data 91 output from the S2Ps 52, such as the S2P-1, S2P-2, S2P-3 and S2P-4, in some embodiments of the present disclosure, as shown in FIG. 21, the display driving circuit 50 further includes a mode controller 56.

For example, the mode controller 56 is electrically connected to the S2Ps 52 (e.g., the S2P-1, S2P-2, S2P-3 and S2P-4). For example, the mode controller 56 may be further electrically connected to the first control signal terminal X1 (in the pixel driving circuit 60, as shown in FIG. 3) and the second control signal terminal X2 (in the pixel driving circuit 60, as shown in FIG. 3).

On this basis, the mode controller 56 receives the parallel mode data 91 obtained by the conversion of each S2P 52, and electrically connects the first control signal terminal X1 and the second control signal terminal X2 according to the received mode information including the parallel mode data.

Hereinafter, a specific process in which the display driving circuit 50 may further realize mode control will be described in detail with reference to FIGS. 20 and 21.

Firstly, before the SPI 51 transmits the serial display data 71 to the S2P 52 through the signal line SI, the SPI 51 transmits the serial mode data 91 to the S2P 52 through the signal line SI.

For example, as shown in FIG. 20, when the chip selection signal is at a high level, the display driving circuit 50 starts to operate. In this case, the signal lines SI, such as the SI1, SI2, SI3 and SI4, each firstly send two mode data 91 to a respective one of S2Ps 52 in FIG. 21, such as the S2P-1, S2P-2, S2P-3 and S2P-4. The signal line SI transmits two mode data 91, and the mode data 91 is changed at each rising edge of the CLK, and is read at an immediately following falling edge. The 4 signal lines may each transmit two mode data 91 synchronously through 2 changes of the CLK. Moreover, since the clock signal has the timeliness, the two mode data 91 are serial. Finally, the 8 mode data 91 transmitted synchronously through the 4 signal lines are output to the 4 S2Ps 52.

In this way, a purpose of transmitting all the mode data 91 in the frame of target data to the S2Ps 52 through the N data output terminals 513 of the SPI 51 is achieved.

It will be noted that N is set to 4 and J is set to 8, which are an exemplary description, and are not limited, depending on actual situation.

Secondly, the S2P 52 converts the two received serial mode data 91 into two parallel mode data 91.

It will be noted that a process of using the S2P 52 to convert the two serial mode data 91 into the two parallel mode data 91 is similar to the process of using the S2P 52 to convert the M serial display data 71 into the M parallel display data, which will not be repeated here.

Finally, the mode controller 56 is used to receive the J mode data 91 output from the S2Ps 52, and electrically connect the first control signal terminal X1 and the second control signal terminal X2 according to the J mode data 91.

In this way, the mode controller 56 may realize other functions of the display driving circuit 50 according to the J mode data 91. For example, the mode controller 56 electrically connects the first control signal terminal X1 and the second control signal terminal X2 according to the J mode data 91, so that the first control signal terminal X1 and the second control signal terminal X2 that are short-circuited each output the voltage waveform consistent with the waveform of the common voltage Vcom. That is, the voltage difference between the two ends of the liquid crystal layer 20 is 0, so that the display panel 01 displays a completely black screen.

Moreover, the J mode data 91 are output to the N S2Ps 52 through the N signal lines SI, and the N S2Ps 52 are each used to convert the serial mode data 91 into the parallel mode data 91, so that the operating efficiency of the display driving circuit 50 may be greatly improved.

It will be noted that each signal line SI only transmits two serial mode data 91, which is merely an exemplary description, and each signal line SI transmits at least two serial mode data 91. It will be noted that in the display driving circuit 50, materials and sizes of wires that connect various portions are not limited. Moreover, for two unconnected wires, in a case where orthographic projections of the two unconnected wires on the base 40 are overlapped with each other, the two unconnected wires have insulating layer(s) therebetween. The number of the film layer(s) and material of the insulating layer are not limited.

The foregoing descriptions are merely specific implementation manners of the present disclosure, but the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. A display substrate, having a display area and a peripheral area around the display area, the display substrate comprising:

a plurality of sub-pixels arranged in an array in the display area;

an interface circuit located in the peripheral area and used to receive target data, the target data including a plurality of serial display data;

at least two serial-to-parallel converters in the peripheral area, a serial-to-parallel converter in the at least two serial-to-parallel converters being electrically connected to the interface circuit and used to convert the plurality of serial display data into parallel display data;

at least one display driver in the peripheral area, the serial-to-parallel converter being electrically connected to at least one display driver to provide the parallel display data to the display driver, and the display driver being used to output display driving signals to sub-pixels according to the parallel display data;

a decoder located in the peripheral area; and a gate circuit electrically connected to the decoder, wherein the interface circuit includes at least two data output terminals connected to the serial-to-parallel converters in one-to-one correspondence;

the interface circuit is further used to output the target data to the serial-to-parallel converters through the data output terminals according to a received clock signal and a received chip selection signal;

the target data further include address information, and the address information includes S address data, and S is an integer greater than or equal to 2;

the interface circuit is further used to obtain the address information in the target data;

the interface circuit is further used to output at least some of the S address data to at least one serial-to-parallel converter through at least one data output terminal according to the received clock signal and the received chip selection signal;

the interface circuit is used to output the S address data to one serial-to-parallel converter through one data output terminal; or the interface circuit is used to output the S address data to a plurality of serial-to-parallel converters through a plurality of data output terminals, address data output from different data output terminals are different, and a total number of the address data output from all the plurality of data output terminals is S;

the decoder is electrically connected to at least one serial-to-parallel converter, and used to receive the S address data output from the at least one serial-to-parallel converter and generate a row gate signal; and the decoder is further used to output the row gate signal to the gate circuit.

2. The display substrate according to claim 1, wherein the display substrate further comprises a plurality of data lines extending in a first direction and a plurality of gate signal lines extending in a second direction, and the first direction and the second direction intersect;

a data line in the plurality of data lines is used to output a display driving signal to at least one sub-pixel, and a gate signal line in the plurality of gate signal lines is used to output the row gate signal to at least one sub-pixel.

3. The display substrate according to claim 2, wherein a number of the at least one display driver is N, and N is an integer greater than or equal to 2; each display driver is connected to at least one data line, and the display driver outputs a display driving signal in the display driving signals to sub-pixels through the at least one data line;

the serial-to-parallel converters are connected to the display drivers in one-to-one correspondence.

4. The display substrate according to claim 2, wherein the gate circuit is located in the peripheral area, and the gate circuit is connected to at least one of the gate signal lines, and outputs the row gate signal to the at least one gate signal line.

5. The display substrate according to claim 1, wherein the serial-to-parallel converter includes a plurality of cascaded D flip-flops; an output terminal of a previous stage D flip-flop is electrically connected to an input terminal of an adjacent next stage D flip-flop; an input terminal of a first stage D flip-flop is electrically connected to a corresponding data output terminal;

an output terminal of each D flip-flop in a same serial-to-parallel converter is electrically connected to a same display driver.

6. A display panel, comprising the display substrate according to claim 1.

7. The display substrate according to claim 1, wherein the target data further include mode information, and the mode information includes J mode data, and J is an integer greater than or equal to 2;

the interface circuit is further used to obtain the mode information in the target data;

the interface circuit is further used to output at least some of the J mode data to at least one serial-to-parallel converter through at least one data output terminal according to the received clock signal and the received chip selection signal.

8. The display substrate according to claim 7, wherein the interface circuit is used to output the J mode data to one serial-to-parallel converter through one data output terminal; or the interface circuit is used to output the J mode data to a plurality of serial-to-parallel converters through a plurality of data output terminals, mode data output from different data output terminals are different, and a total number of the mode data output from all the plurality of data output terminals is J.

9. The display substrate according to claim 8, wherein the display substrate further comprises:

a mode controller located in the peripheral area, the mode controller being electrically connected to at least one serial-to-parallel converter, and used to receive the J mode data output from the at least one serial-to-parallel converter and electrically connect a first control signal terminal and a second control signal terminal in the display substrate according to the J mode data.

10. A driving method, comprising:

receiving, by an interface circuit, target data;

obtaining, by the interface circuit, a plurality of serial display data from the target data;

outputting, by the interface circuit, the plurality of serial display data to the at least two serial-to-parallel converters;

converting, by the at least two serial-to-parallel converters, obtained respective serial display data into parallel display data;

outputting, by the at least two serial-to-parallel converters, parallel display data to at least one display driver; and outputting, by the display driver, display driving signals to sub-pixels according to the obtained parallel display data;

wherein outputting, by the interface circuit, the plurality of serial display data to the serial-to-parallel converters, includes:

outputting, by the interface circuit, the plurality of serial display data to the serial-to-parallel converters according to a received clock signal and a received chip selection signal;

wherein the target data further include address information, and the address information includes S address data, and S is an integer greater than or equal to 2; the method further includes:

obtaining, by the interface circuit, the address information in the target data; and outputting, by the interface circuit, the S address data to one serial-to-parallel converter according to the received clock signal and the received chip selection signal; or, outputting, by the interface circuit, the S address data to a plurality of serial-to-parallel converters, address data received by different serial-to-parallel converters being different, and a total number of the address data received by all the plurality of serial-to-parallel converters being S;

wherein the method further comprises:

receiving, by a decoder, the S address data output from at least one serial-to-parallel converter;

generating, by the decoder, a row gate signal according to the S address data; and outputting, by the decoder, the row gate signal to a gate circuit.

11. The driving method according to claim 10, wherein the display substrate further includes a plurality of data lines; outputting, by the display driver, the display driving signals to the sub-pixels according to the obtained parallel display data, includes:

outputting, by each display driver, a display driving signal in the display driving signals to at least one sub-pixel through at least one data line according to the obtained parallel display data.

12. The driving method according to claim 10, wherein the target data further include mode information, and the mode information includes J mode data, and J is an integer greater than or equal to 2; the method further includes:

obtaining, by the interface circuit, the mode information in the target data; and outputting, by the interface circuit, at least some of the J mode data to at least one serial-to-parallel converter according to the received clock signal and the received chip selection signal.

* * * * *